(12) United States Patent
Ogle et al.

(10) Patent No.: US 6,884,016 B2
(45) Date of Patent: Apr. 26, 2005

(54) POSITIONING SYSTEM FOR AN AUTOMATIC ACCUMULATION SYSTEM

(75) Inventors: Richard J. Ogle, Neenah, WI (US); Steven A. Hellmann, Oshkosh, WI (US)

(73) Assignee: Kimberly-Clark Worldwide, Inc., Neenah, WI (US)

(*) Notice: Subject to any disclaimer, the term of this patent is extended or adjusted under 35 U.S.C. 154(b) by 142 days.

(21) Appl. No.: 10/288,159

(22) Filed: Nov. 4, 2002

(65) Prior Publication Data

US 2004/0086372 A1 May 6, 2004

(51) Int. Cl.[7] ............................................. B65G 47/24
(52) U.S. Cl. ...................... 414/272; 193/44; 198/396; 198/546
(58) Field of Search ................................ 193/44, 46, 10, 193/27; 198/396, 406, 546; 414/272

(56) References Cited

U.S. PATENT DOCUMENTS

| | | | |
|---|---|---|---|
| 1,853,478 A | | 4/1932 | Vincent |
| 2,005,629 A | * | 6/1935 | Marsden ..................... 198/400 |
| 2,273,509 A | | 2/1942 | Braren |
| 2,519,491 A | | 8/1950 | Monaco |
| 2,552,620 A | | 5/1951 | Christian |
| 2,667,958 A | | 2/1954 | Malhiot |
| 2,849,099 A | | 8/1958 | Halahan et al. |
| 2,879,919 A | | 3/1959 | Knoche |
| 3,240,311 A | | 3/1966 | Hofer et al. |
| 3,338,376 A | | 8/1967 | Cross |
| 3,352,455 A | | 11/1967 | Wysocki et al. |
| 3,512,336 A | | 5/1970 | Rosecrans |
| 3,513,956 A | * | 5/1970 | Rayment ..................... 193/44 |
| 3,608,271 A | * | 9/1971 | Pilat ............................ 53/212 |
| 3,641,735 A | | 2/1972 | Daily et al. |
| 3,685,471 A | | 8/1972 | Reynolds |

(Continued)

FOREIGN PATENT DOCUMENTS

| | | |
|---|---|---|
| DE | 566 007 C | 12/1932 |
| DE | 24 37 556 A1 | 2/1976 |
| DE | 43 14 878 A1 | 11/1994 |
| DE | 196 01 664 A1 | 7/1997 |
| EP | 0 698 569 A1 | 2/1996 |
| EP | 0 968 939 A1 | 1/2000 |
| EP | 1 041 005 A1 | 10/2000 |
| EP | 1 283 183 A1 | 2/2003 |
| EP | 1 329 384 A1 | 7/2003 |
| FR | 1 025 658 A1 | 4/1953 |
| FR | 1 484 885 A1 | 6/1967 |
| FR | 2 605 592 A1 | 4/1988 |
| FR | 2 778 898 A1 | 11/1999 |
| FR | 2 825 352 A1 | 12/2002 |
| GB | 930405 A | 7/1963 |
| GB | 1 065 888 A | 4/1967 |
| GB | 2 094 258 A | 9/1982 |
| JP | 05229634 A * | 9/1993 ........... B65G/47/24 |
| NL | 9001287 A | 1/1992 |
| SU | 700 390 | 12/1979 |
| WO | WO 94/14685 A2 | 7/1994 |

OTHER PUBLICATIONS

Patent Cooperation Treaty Search Report from the International Search Authority, International Application No. PCT/US 03/34545 dated Jul. 20, 2004.

*Primary Examiner*—Kathy Matecki
*Assistant Examiner*—Mark A. Deuble
(74) *Attorney, Agent, or Firm*—Paul Y. Yee

(57) ABSTRACT

A method and apparatus for accumulating articles (28) includes inputting a plurality of individual articles to deliver the articles from an article supply source (26) onto an inclined slide (42) having a guide surface. In particular aspects, the articles are regulated with a guide member (44), and directed to a first conveyor (50).

33 Claims, 22 Drawing Sheets

U.S. PATENT DOCUMENTS

| | | |
|---|---|---|
| 3,710,922 A | 1/1973 | Lanphere et al. |
| 3,716,123 A | 2/1973 | Becker |
| 4,024,965 A | 5/1977 | Marth et al. |
| 4,054,015 A | 10/1977 | Rowell |
| 4,205,743 A | 6/1980 | Whitmore |
| 4,226,324 A | 10/1980 | Stocker |
| 4,265,072 A * | 5/1981 | Egli .......................... 53/501 |
| 4,433,595 A | 2/1984 | Rosa et al. |
| 4,515,291 A | 5/1985 | Holmes |
| 4,564,110 A * | 1/1986 | Kasprzyk ................... 209/544 |
| 4,646,509 A | 3/1987 | Tribert |
| 4,768,642 A | 9/1988 | Hunter |
| 4,802,570 A | 2/1989 | Hirsch et al. |
| 4,864,801 A | 9/1989 | Fallas |
| 4,915,547 A | 4/1990 | Cahill et al. |
| 4,984,678 A | 1/1991 | Fauchard |
| 5,095,684 A | 3/1992 | Walker et al. |
| 5,127,209 A | 7/1992 | Hunter |
| 5,257,493 A | 11/1993 | Cocchi et al. |
| 5,353,914 A | 10/1994 | Stephen et al. |
| 5,474,168 A | 12/1995 | Leslie et al. |
| 5,575,712 A | 11/1996 | Krewer |
| 5,597,285 A | 1/1997 | Meyer et al. |
| 5,653,330 A | 8/1997 | Muenker |
| 5,787,680 A | 8/1998 | Tisma et al. |
| 6,006,891 A | 12/1999 | Iwano et al. |
| 6,151,867 A | 11/2000 | Focke et al. |
| RE37,405 E | 10/2001 | Shirodera |
| 6,397,567 B1 | 6/2002 | Focke et al. |
| 6,564,925 B1 | 5/2003 | Cadwallader et al. |
| 2003/0019189 A1 | 1/2003 | Weaver et al. |

* cited by examiner

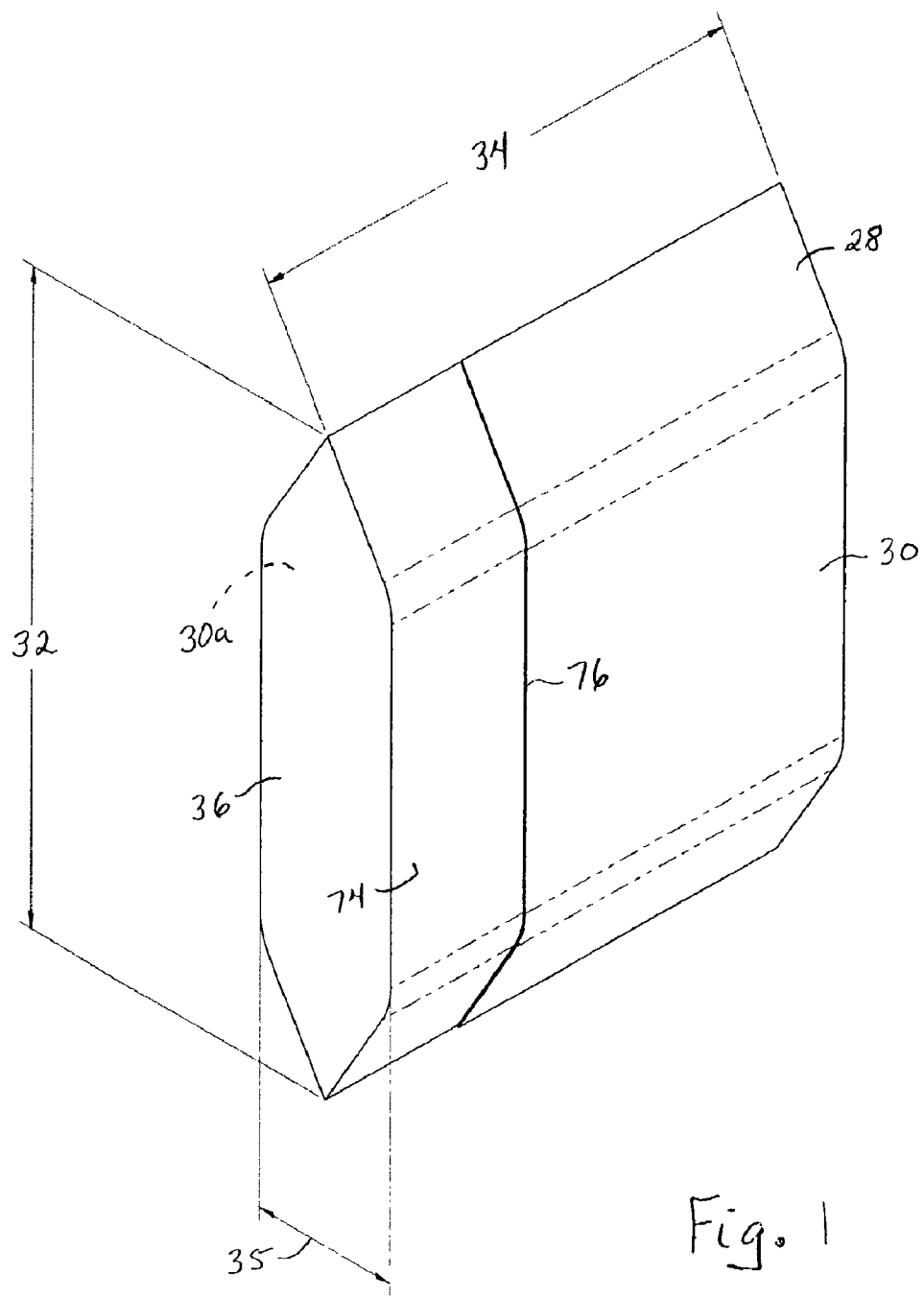

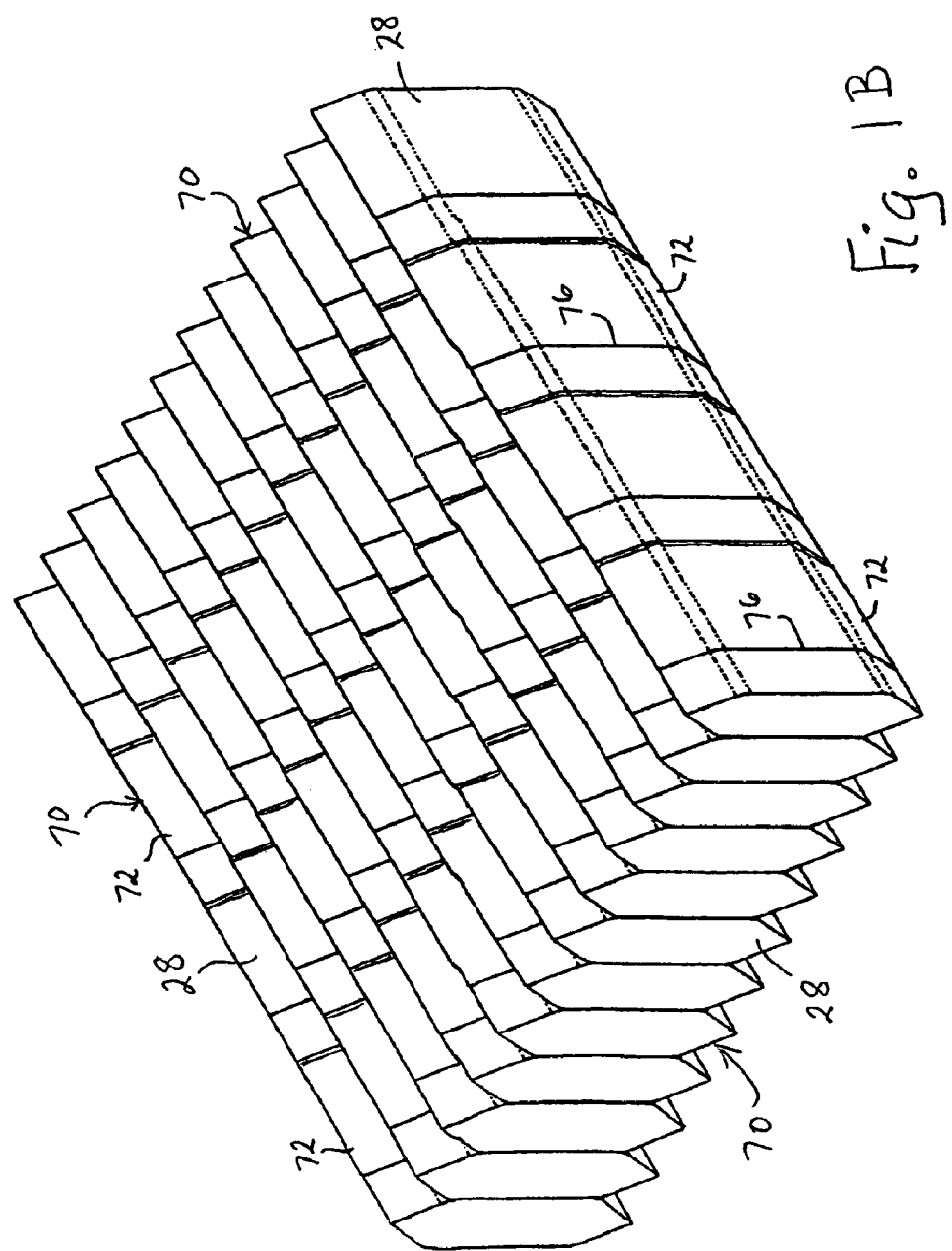

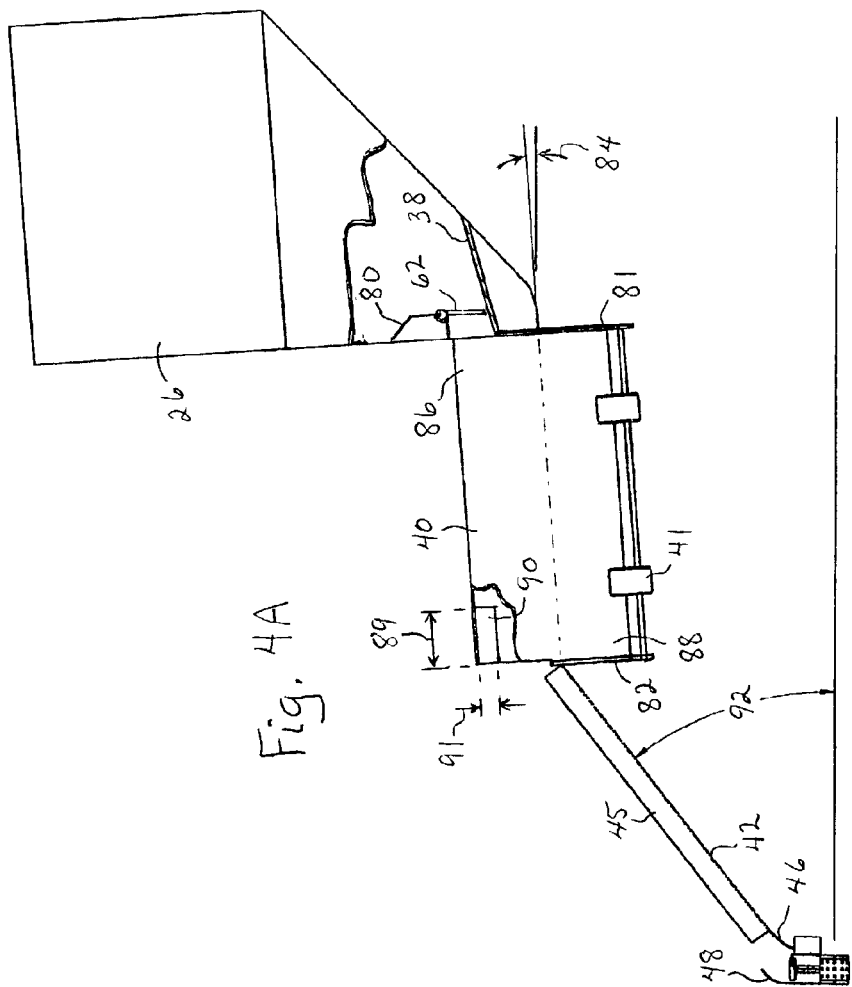

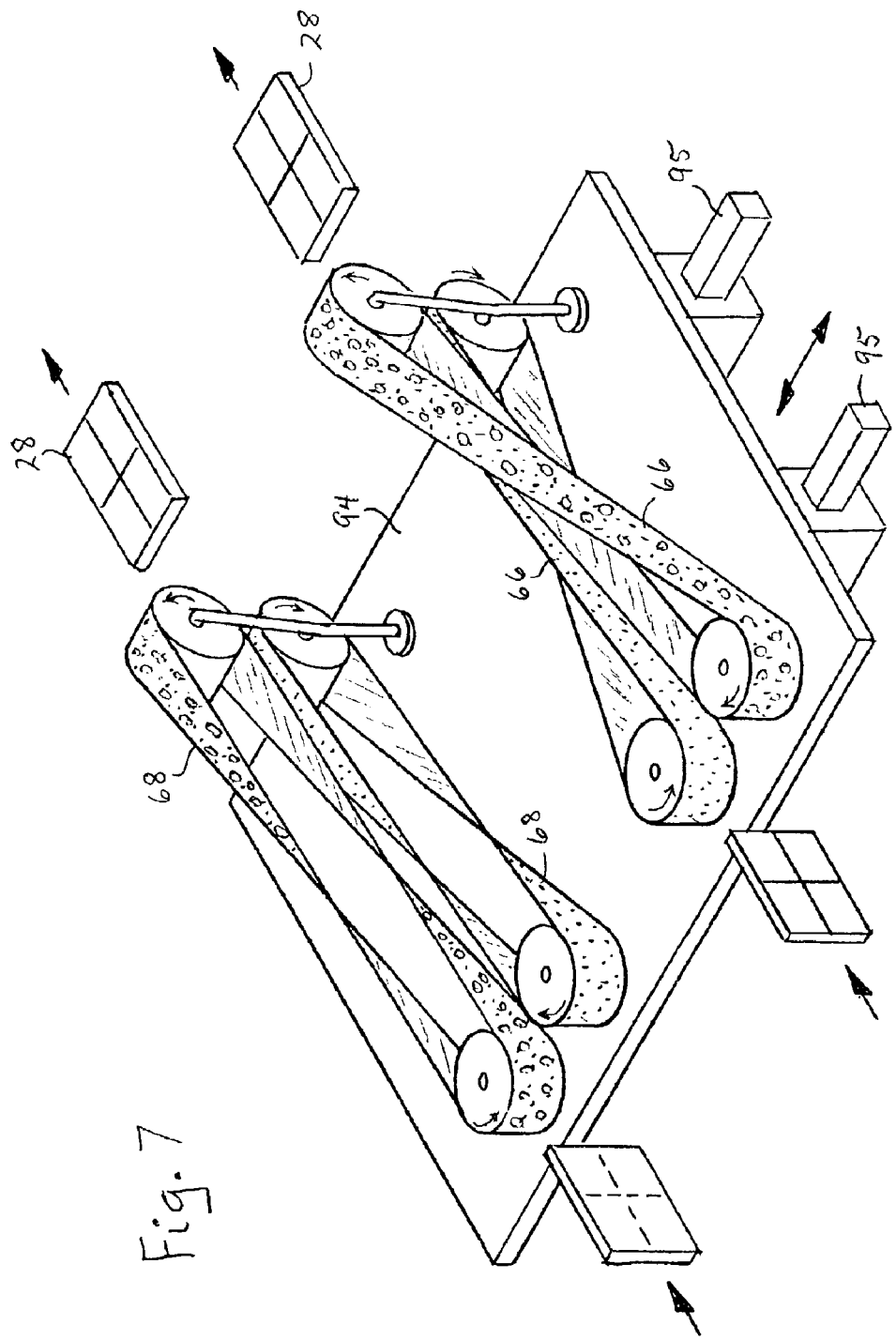

POSITIONING SYSTEM FOR AN AUTOMATIC ACCUMULATION SYSTEM

FIELD OF THE INVENTION

The invention generally relates to an apparatus and method for processing individual, loose articles. More particularly the invention relates to an apparatus and method for efficiently arranging loose articles into a configuration that can be readily introduced into a selected packaging system.

BACKGROUND OF THE INVENTION

Conventional systems for automatically packaging articles produced on a manufacturing line are well known. Individual articles received from the manufacturing line have been counted and arranged into one or more stacks by employing conventional devices. Additionally, conventional devices have been employed to insert the stacks into preselected packages, such as cartons or bags.

During the conventional stacking and packaging operations, however, individual articles have often become dislodged or otherwise diverted from the ordinary manufacturing and packaging operations. While the resulting loose articles have been commercially acceptable, it has been difficult to reintroduce the articles into the ongoing manufacturing processes. Typically, the individual loose articles have been gathered, rearranged and stacked by hand. The resulting stacks have then been manually introduced back into the packaging operation.

The manual sorting and stacking operations, however, have been excessively inefficient and costly. As a result, there has been a continuing need for an automated system that can more efficiently rearrange, sort and reorient the individual loose articles. There has also been a continuing need for an automated system that can more efficiently stack or otherwise arrange the articles, and insert the resulting article stacks or other arrangements into desired packages.

BRIEF DESCRIPTION OF THE INVENTION

A method for accumulating articles includes inputting a plurality of individual articles to deliver the articles from an article supply source onto an inclined slide having a guide surface. In particular aspects, the articles are regulated with a guide member; and directed to a first conveyor.

An apparatus aspect can include an article supply source. In particular aspects, an inclined slide has a guide surface and can be configured to receive articles delivered from the article supply source. In a further aspect, a guide member can be configured to regulate the articles delivered to the inclined slide.

Additional features can include guide member which is formed to incorporate a generally S-shaped, funnel curve; and an article stop plate mechanism which can direct the articles to engage an edge region of each article on the first conveyor, and provide a standing, on-edge arrangement of each article. Still another feature can include a transfer guide ramp mechanism which can operatively provide a substantially smooth contour between the inclined slide and the first conveyor.

In its various aspects and features, the present invention can more effectively and more efficiently provide a processing system capable of converting individual, loose articles into a configuration that can be efficiently and automatically recovered and inserted into a selected packaging system. The method and apparatus of the invention can effectively accumulate, meter, orient, arrange, and transfer the recovered articles into the packaging system. The technique of the invention is readily placed at a desired location, and is readily adaptable to handle grade changes and different types of articles. Additionally, the method and apparatus of the invention can be highly reliable and can operate at desired, high speeds.

BRIEF DESCRIPTION OF THE DRAWINGS

The invention will be more fully understood and further advantages will become apparent when reference is made to the following detailed description of the invention and to the drawings in which:

FIG. 1 shows a perspective view of a representative article that can be processed by the method and apparatus of the invention.

FIG. 1B shows a perspective view of a representative grouping of article-sets which form a representative plurality of article-sets that can be produced and processed by the method and apparatus of the invention.

FIG. 4A representatively shows a schematic, partially cut-away, side view of the metering section and directing or guide section that can be employed in the method and apparatus of the invention.

FIG. 7 representatively shows a schematic, perspective view of an orienting section that employs an indexing carriage.

DETAILED DESCRIPTION OF THE INVENTION

It should be noted that, when employed in the present disclosure, the terms "comprises", "comprising" and other derivatives from the root term "comprise" are intended to be open-ended terms that specify the presence of any stated features, elements, integers, steps, or components, and are not intended to preclude the presence or addition of one or more other features, elements, integers, steps, components, or groups thereof.

Figure 2:
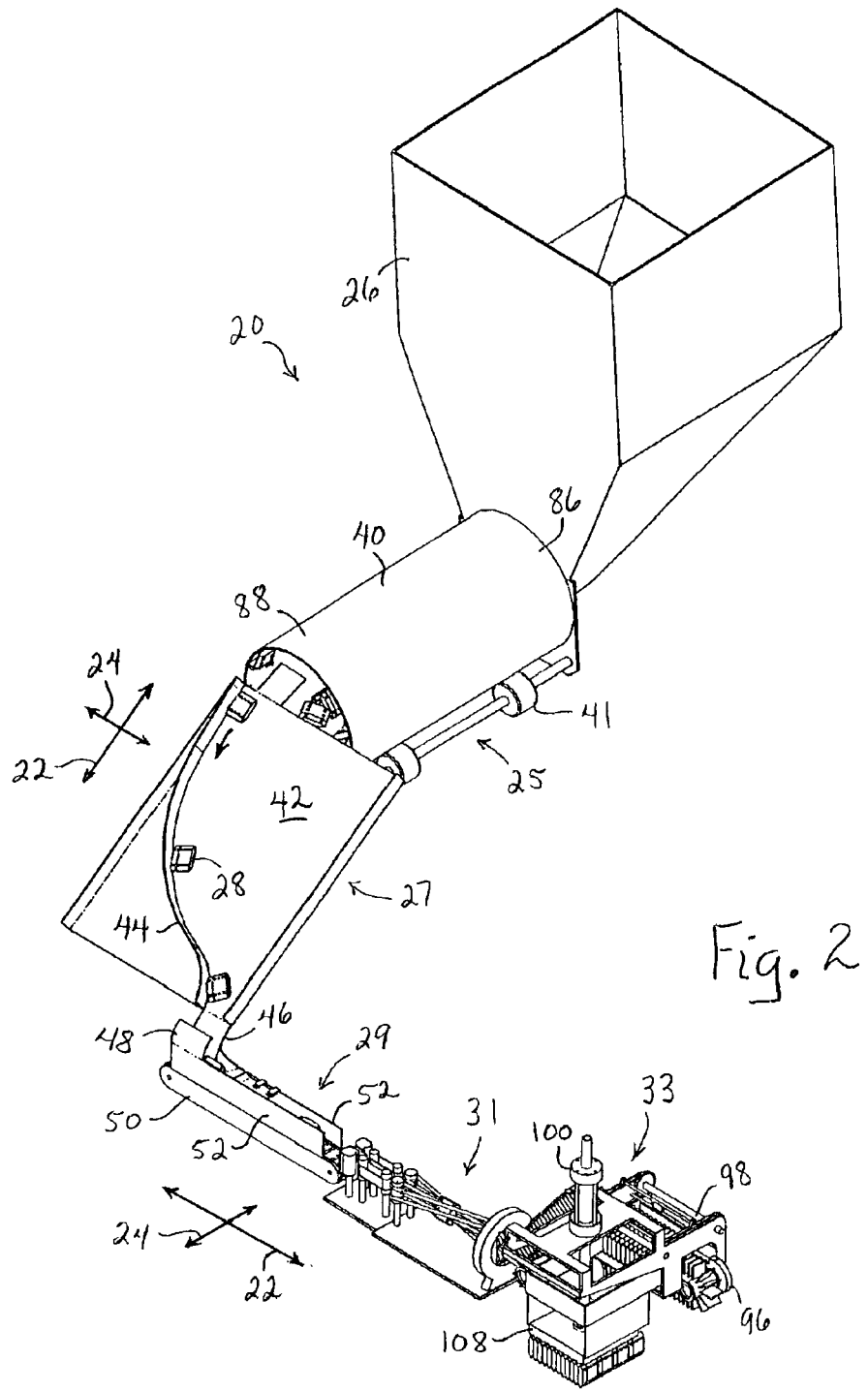
FIG. 2 shows a schematic view of a representative method and apparatus of the invention.
Figure 3:
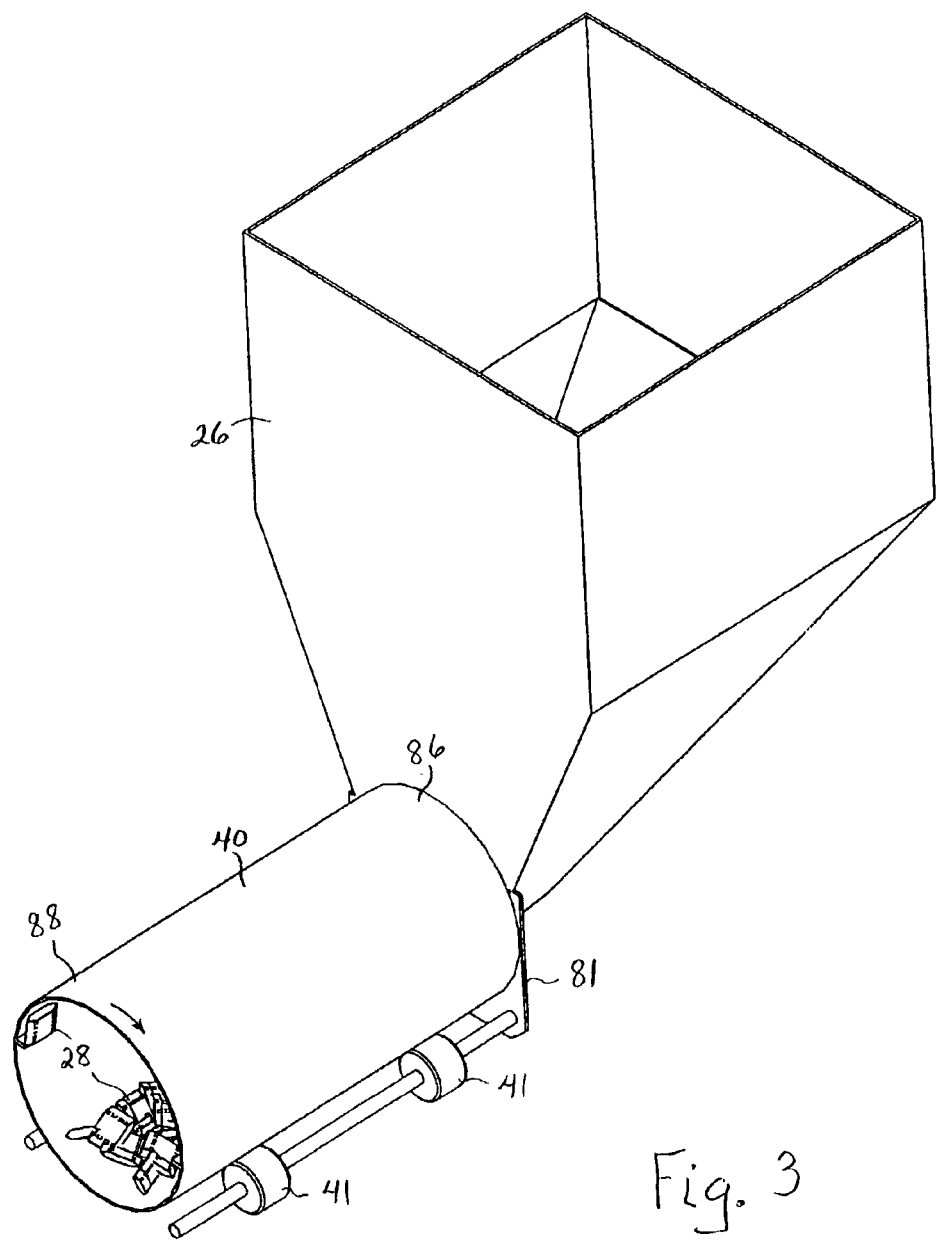
FIG. 3 representatively shows a schematic, perspective view of a metering section that can be employed with the present invention.
Figure 3A:
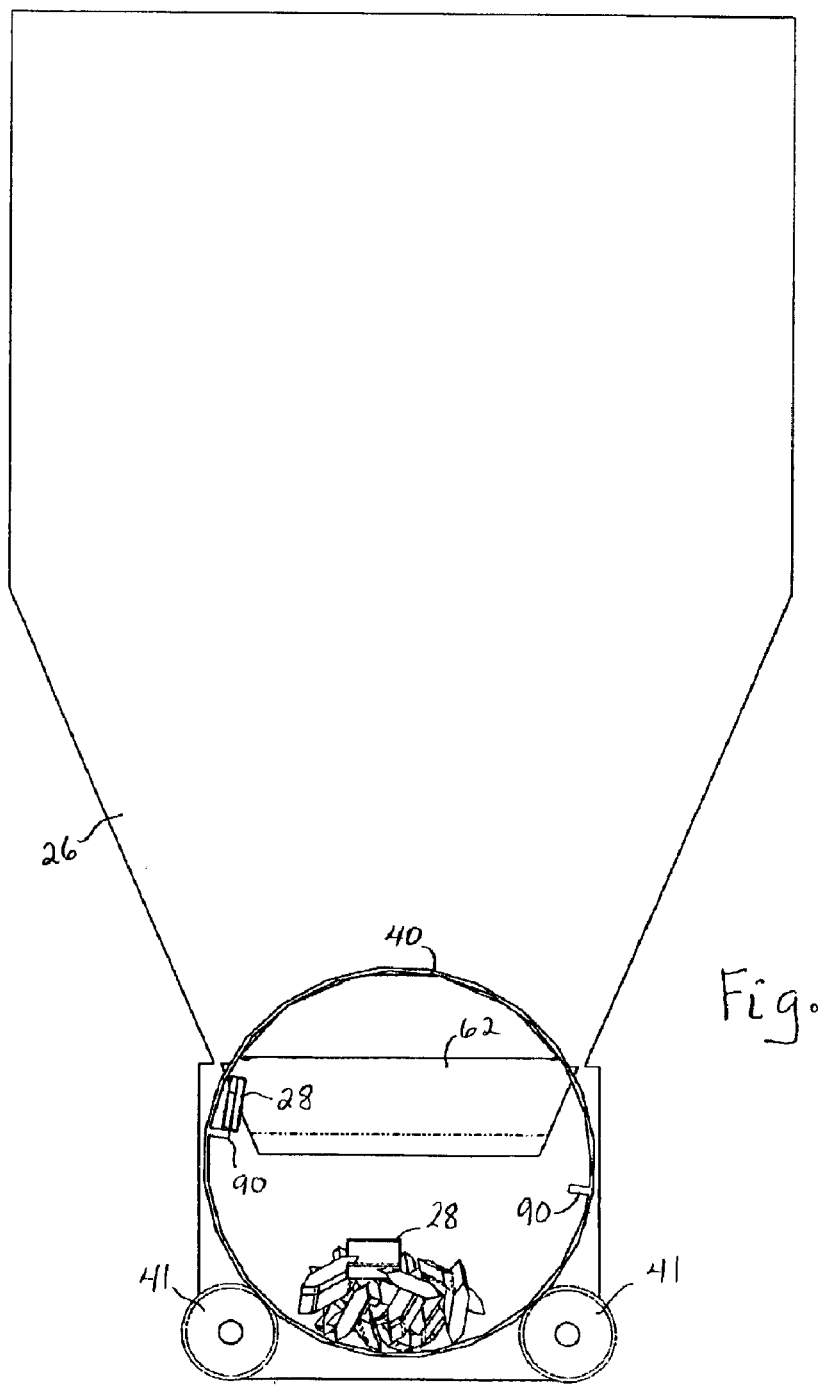
FIG. 3A representatively shows a schematic end view of a metering section that can be employed with the present invention.
Figure 5:
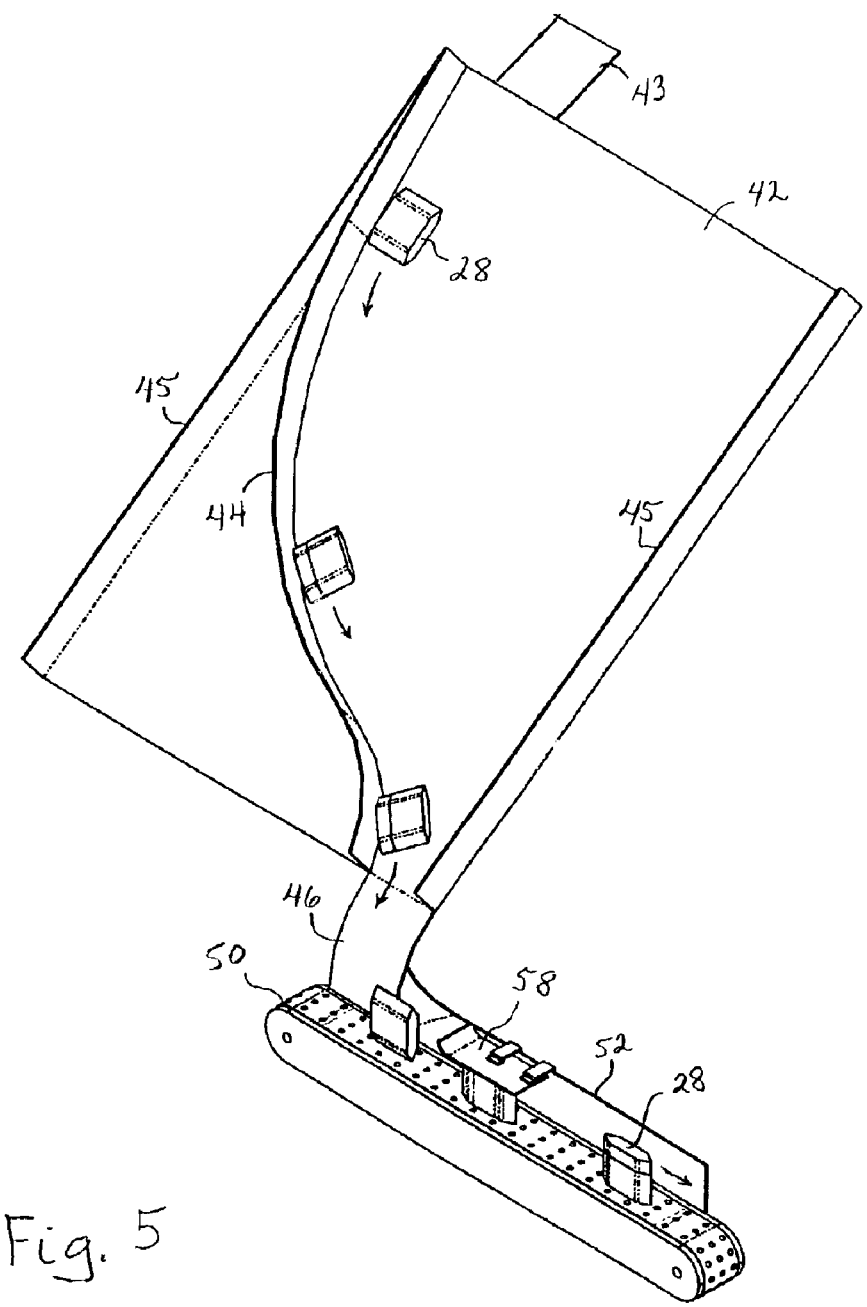
FIG. 5 representatively shows a schematic, perspective view of an alignment section that can be employed with the present invention.
Figure 5A:
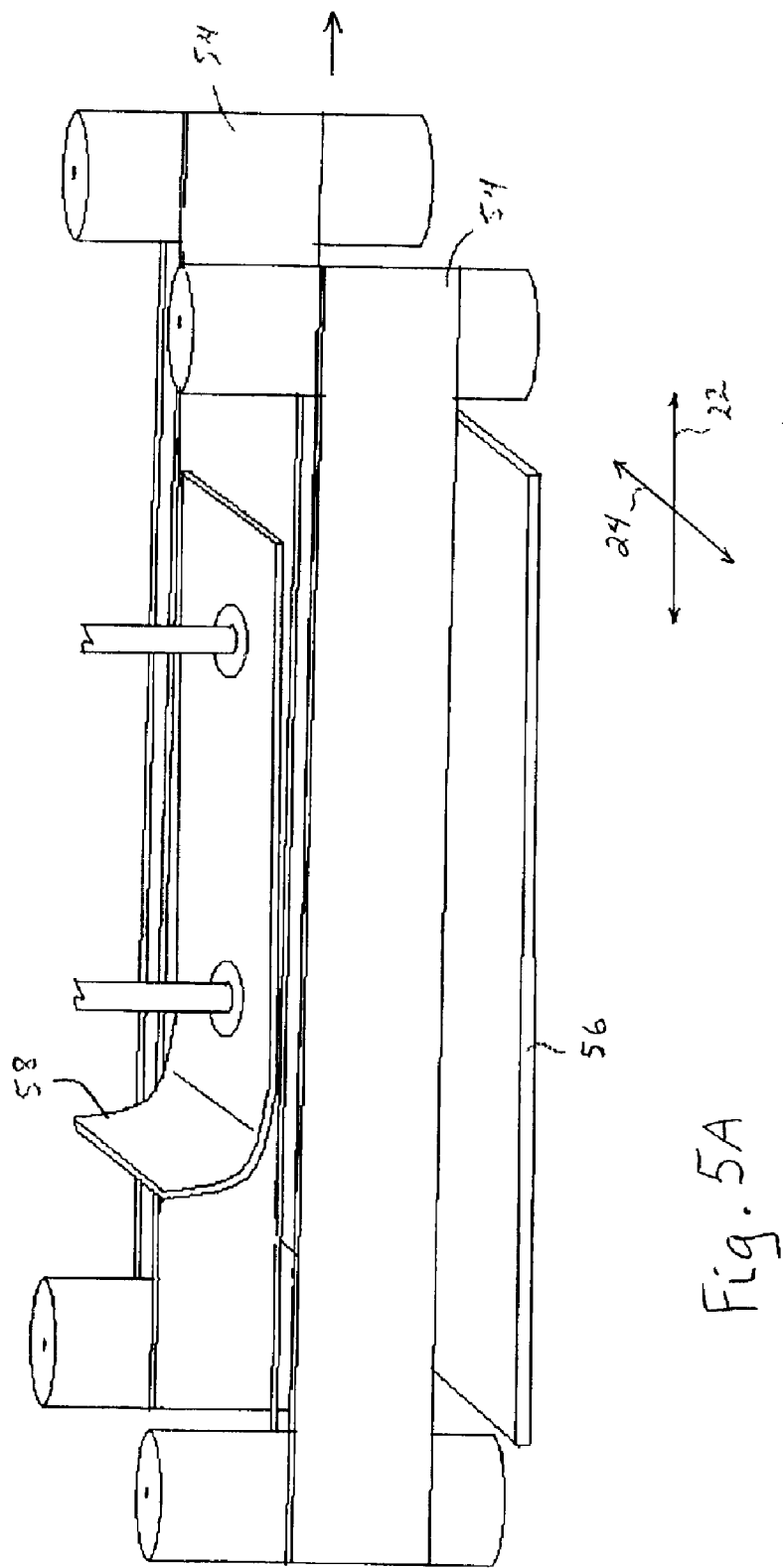
FIG. 5A representatively shows an enlarged, schematic, perspective view of an alignment section that can be employed with the present invention.

With reference to FIGS. 2 and 5A, the process and apparatus 20 of the invention can have a lengthwise, machine-direction 22 which extends longitudinally, a lateral cross-direction 24 which extends transversely, and an appointed z-direction. For the purposes of the present disclosure, the machine-direction 22 is the direction along which a particular component or material is transported length-wise along and through a particular, local position of the apparatus and method. The cross-direction 26 lies generally parallel to the local horizontal, and is aligned perpendicular to the local machine-direction 22. The z-direction is aligned substantially perpendicular to both the machine-direction 22 and the cross-direction 24, and extends generally along a depth-wise, thickness dimension.

Figure 1A:
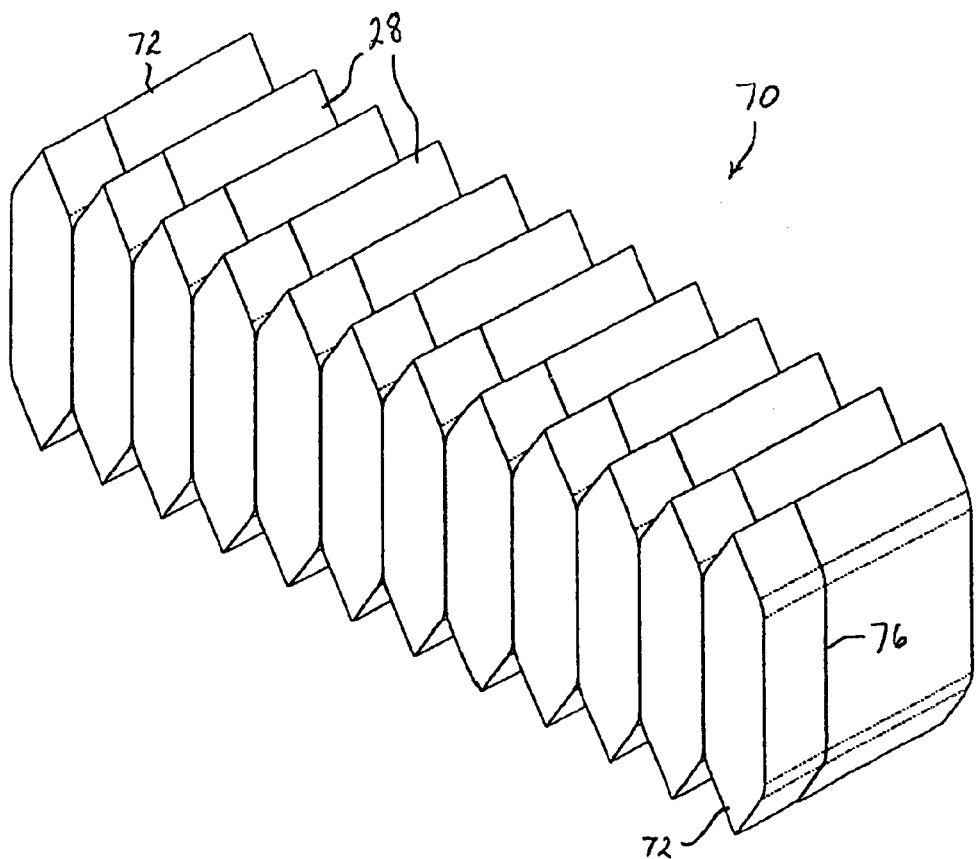
FIG. 1A shows a perspective view of a representative article-set that can be produced and processed by the method and apparatus of the invention.

As illustrated, the present invention can provide a distinctive technique and system for accumulating selected articles. With reference to FIGS. 1 and 2, a method aspect can comprise an inputting of a plurality of individual articles 28 from an article supply source 26. Each article can have at least a first major facing surface 30, a first article dimension 32 extending along a first article direction, a second article dimension 34 extending along a second article direction which differs from the first article direction, and an article edge region 36. Each article can be directed to a first conveyor 50, and in a particular aspect, the first article dimension of each article can be aligned along a selected machine-direction 22. Another aspect can include an identifying of an article-set 70 which contains a selected, predetermined number of the articles. Further aspects can include a forming of at least one article-set which contains the selected number articles arranged in a stack or other configuration that is suitable for packaging, and a moving of the article-set into a package. In additional aspects, the inputting of the articles can include a metering of the articles, and the inputting of the articles can include a dispensing of the articles 28 with a rotating, metering drum 40. In still further aspects, the inputting of the articles can include a delivering of the articles onto a guide surface, and the delivering of the articles can include a laying of the articles onto a directing slide 42, which may be inclined.

An apparatus aspect can comprise an input mechanism which delivers a plurality of individual articles 28 from an article supply source 26. Each article can have at least a first major facing surface 30, a first article dimension 32 extending along a first article direction, and an article edge region 36. A guide mechanism can direct the articles 28 to a first conveyor 50, and an alignment mechanism can orient the first article dimension of each article 28 along a selected machine-direction 22. A sorting mechanism can form at least one article-set 70 that contains a selected number of the articles 28 arranged in a configuration suitable for packaging, and a transfer mechanism can move the article-set 70 into a suitable, conventional package. Another aspect can include a processing mechanism which operatively groups a plurality of article-sets 70, and the article-sets can be moved into an appropriate package.

In another aspect, a method 20 for accumulating articles 28 can include a dispensing of the articles with a rotating, metering drum 40 for movement to a first conveyor 50. The metering drum 40 has an entry end 86 and an exit end 88, and in a particular aspect, the metering drum 40 can be configured such that a rotation of the metering drum overcomes a static friction which would inhibit a movement of the articles 28 downstream through the metering drum.

Another apparatus aspect can include a rotatable, metering drum 40 which can dispense the articles 28 for movement to a first conveyor 50. The metering drum 40 has an entry end 86 and an exit end 88, and in a particular aspect, the metering drum 40 can be configured such that a rotation of the metering drum overcomes a static friction which would inhibit a movement of the articles 28 downstream through the metering drum 40.

In another feature the metering drum 40 can include at least one lug member 90 which is positioned and attached inside the metering drum at the exit end 88 of the metering drum. In further features, a ramp member 43 can be configured to extend an operative distance into the volume of the metering drum, and can be spaced away from an inside wall surface of the metering drum by a selected offset distance.

In a further aspect, a method for accumulating articles 28 includes inputting a plurality of individual articles to deliver the articles from an article supply source 26 onto an inclined slide 42 having a guide surface. In particular features, the articles can be regulated with a guide member 44, and directed to a first conveyor 50.

A further apparatus aspect can include an article supply source 26. In particular aspects, an inclined slide 42 has a guide surface and can be configured to receive articles 28 delivered from the article supply source 26. In further features, a guide member 44 can be configured to regulate the articles delivered to the inclined slide 42, and the articles can be delivered to a first conveyor 50.

Additional features can include guide member 44 which is formed to incorporate a generally S-shaped, funnel curve; and an article stop plate mechanism 48 which can direct the articles to engage an edge region 36 of each article 28 on the first conveyor 50, and provide a standing, on-edge arrangement of each article. Still another feature can include a transfer guide ramp mechanism 46 which can operatively provide a substantially smooth contour between the inclined slide 42 and said first conveyor 50.

An additional method aspect for accumulating articles 28 can include conveying a plurality of individual articles with a stacking conveyor 96. In particular aspects, the stacking conveyor can have a plurality of holding members 112 that project away from an article-side surface of the stacking conveyor 96, and the stacking conveyor can be arranged with an elbow configuration to substantially avoid an undesired encircling or surrounding of a substantially fixed portion of cooperating downstream equipment.

An additional apparatus aspect can include a stacking conveyor 96 for moving a plurality of individual articles 28. The stacking conveyor 96 can be arranged with an elbow configuration which substantially avoids an undesired encircling or surrounding of a substantially fixed portion of cooperating, downstream equipment. Additionally, the stacking conveyor can have a plurality of holding members 112 that project away from an article-side surface of the stacking conveyor 96.

In another feature, the method and apparatus can include a turning mechanism which forms the elbow configuration. The turning mechanism can include a first turn roller system 128 and a second turn roller system 130 (e.g. FIG. 9). The first turn roller system 128 can be configured to operatively engage at least an appointed bottom portion of the stacking conveyor 96, and the second turn roller system 130 can be configured to operatively engage at least a portion of an appointed article-side of the stacking conveyor.

A further feature can include a transfer system 98 which can cooperate with a vacuum system 100 to load the articles 28 into downstream packaging equipment. The vacuum system 100 can desirably be configured to vacuum-hold the articles 28 in a substantially fully-suspended position. Still another aspect can include a storage buffer mechanism 104 which provides an area upon which to stage at least one article-set 70 (e.g. FIG. 10).

In still another aspect, a method for selectively orienting an article 28 can include a selective indexing of a movable carriage 94 (e.g. FIG. 7) between a first carriage position and at least a second carriage position, thereby providing a selected face-alignment of a datum surface 74 of the article. In particular features, the first carriage position can be configured to provide for a first, twist displacement of the article, and the second carriage position can be configured to provide for a second, twist displacement of the article, with the second twist displacement directionally opposite to the first twist displacement.

Still another apparatus aspect for selectively orienting an article 28 can include a movable carriage 94 which can index between a first carriage position and at least a second carriage position, thereby providing a selected face-alignment of a datum surface of said article. The first carriage position can be configured to provide for a first, twist displacement; and the second carriage position can be configured to provide for a second, twist displacement that is directionally opposite to said first twist displacement. In a particular feature, the movable carriage can include an indexing wheel 120 (e.g. FIG. 8). In another feature, at least a first set of twist-belts 66 can be connected to the carriage 94. In a desired arrangement, the first set of twist-belts 66 can be connected to the indexing wheel 120.

In its various aspects and features, the present invention can more effectively and more efficiently provide a processing system that can convert individual, loose articles into a configuration that can be efficiently and automatically recovered and inserted into a selected packaging system. The method and apparatus of the invention can efficiently and automatically meter, align, arrange and transfer the recovered articles into the appointed packaging system. In an optional feature, the system of the invention can also be configured to selectively twist or otherwise orientate the recovered articles into a desired arrangement. A further feature of the method and apparatus can provide an ability to automatically detect an entry point in the final packaging machinery, and transfer a packaging-set of the articles into the packaging machinery, with substantially no manual intervention by an operator.

The technique of the invention can be readily and selectively positioned at a desired location within a manufacturing line, and can be readily adapted to handle grade changes and different types of articles. As a result, the technique of the invention can provide a highly reliable, high-speed method and apparatus that can efficiently accumulate individual articles for packaging.

With reference to FIGS. 1 through 1B, each article can have at least a first major facing surface 30, a first article dimension 32 extending along a first article direction, a second article dimension 34 extending along a second article direction which differs from the first article direction, and an article edge region 36. As representatively shown, the first article dimension 32 can be relatively larger than the second article dimension 34. The article can additionally have at least a second major facing surface 30a which is positioned in an opposed relation to the first major surface 30, and an article thickness dimension 35. In a particular arrangement, the article can include a personal care article. In another arrangement, the article can comprise a packet or pouch which contains a personal care absorbent article. In the various arrangements, the personal care absorbent article can, for example, be a feminine care article, incontinence article, child care article, infant care article or the like. The feminine care article can be a sanitary napkin, a menstrual pad, a panty liner, an interlabial device or the like, as well as a combination thereof.

Proper control of the flow of articles can be particularly important. If a large number of articles are in close proximity to one another and quickly delivered into an accumulation and repacking system, the system can jam, or provide an excessive amount of "dead time" during which no product is being delivered. The method and apparatus can be configured to reduce an undesired clumping and jamming of multiple articles within the process line, and can reduce an accompanying disruption of the accumulation system. In a particular aspect, the system of the invention can provide a substantially single (one-at-a-time) article feed. The system can automatically break down a large quantity of loose articles to substantially eliminate the need for manually feeding by an operator.

With reference to FIG. 2, the accumulation process and system can include a metering section 25, a guide section 27, an alignment section 29 and a loading section 33. Additionally, the method and apparatus may include an orienting section 31.

The metering section can be configured to provide an individual, substantially one-at-a-time pad feeding into the accumulation method and apparatus of the invention. Any operative metering device, such as a an oscillating hopper with a narrow exit orifice, a multistage conveying system, a popcorn apparatus with take-away top mounted vacuum conveyor or the like, can be employed, as well as combinations thereof. With reference to FIGS. 2 through 5, the representatively shown arrangement of the metering device can include a rotatable metering drum 40. In another aspect, the metering device can include a feeder hopper 26. The hopper can provide an operative supply of individual articles 28, and can be configured to operatively control a flow of articles from the hopper. For example, the hopper can be a conventional gravity-fed hopper, and can include an exit gate 62 (e.g. FIG. 4A) which controls a flow of product into the entry of the metering unit. In a particular feature, the gate can open and close based on a detected level of articles in the metering unit. As representatively shown a actuating mechanism 80, such as a mechanism which includes a pneumatic cylinder, can be connected to selectively open and close the exit gate 62.

The metering section can, for example, be provided by a mechanism which includes the shown, rotatable metering drum. The metering drum 40 can be a hollow cylinder, and can have generally circular openings at each terminal end. In a particular feature, the metering drum can be mounted at a selected drum tilt angle 84, as measured from the local horizontal (e.g. FIG. 4A). The drum tilt angle can help the articles flow toward the discharge, exit end of the drum. In a particular aspect, the drum tilt angle can be at least a minimum of about 1 degree (1°). The drum tilt angle can alternatively be at least about 2 degrees, and can optionally be at least about 3 degrees. In another aspect, the drum tilt angle can be up to about 45 degrees, or more. The drum tilt angle can alternatively be up to about 30 degrees, and can optionally be up to about 15 degrees to provide improved performance. In still other arrangements, the drum tilt angle can be not more than about 5 degrees. If the drum tilt angle is too large, there can be an excessive clumping of articles, an excessive tumbling of the articles and an excessive occurrence of downstream jams. If the drum tilt angle is too small the articles may not reliably exit the metering drum.

As representatively shown, an entry end 86 of the metering drum can be mounted relatively higher than an exit end 88 of the drum. Each end of the drum 84 can be selectively, partially blocked by a separate, stationary plate member. Additionally, each plate member can cover approximately ½ to approximately ⅔ of the lower, bottom portion of the drum cylinder. For example, a first stationary plate member 81 can be located upstream of the entry end 86 of the metering drum, and positioned operatively adjacent the entry end of the drum. In a desired arrangement, an approximate, bottom two-thirds of an entry end opening of the drum 86 can be operatively blocked by the first stationary plate 81, leaving an approximate, top one-third of the drum, entry end opening substantially unobstructed. Accordingly, the first stationary plate can hold articles in the metering drum while allowing the metering drum to rotate adjacent the stationary plate.

A second stationary plate member 82 can be located operatively adjacent the exit end 88 of the drum, and positioned relatively downstream from the metering drum. In a desired arrangement, the second stationary plate 82 can operatively cover or otherwise block an approximate, bottom half of an exit end opening of the drum. As a result, the second stationary plate can help prevent articles from falling out from the bottom-side of the drum while allowing the drum to rotate past the stationary plate.

On the entry end 86 of the drum 40, an entry-slide 38 can be cooperatively associated with and positioned at a top region of the first stationary plate at the entry end of the drum. As representatively shown, for example, the entry-slide can be attached or otherwise joined to the top region of the first stationary plate at the entry end of the drum. The entry-slide can funnel or otherwise direct the individual loose article into the drum 40 from the supply/feed hopper, and can include side rails to help hold the articles on the entry-slide. As a result, the system can maintain a substantially consistent level of product can be maintained, and can allow for substantially continuous operation of the accumulation system.

The metering drum 40 can be operatively mounted on external bearings 41 which provide for a desired drum rotation, while maintaining a substantially fixed position of a drum axis of rotation. The drum can be driven externally, and is configured to provide a substantially unobstructed flow of articles through the drum. The drum configuration can generate a proportional relationship between the metering drum's rotational velocity and the article feed rate. In other words, the faster the drum rotates, the faster flow of articles out of the drum. The article feed rate can also be adjusted by altering the drum tilt angle 84. The drum can be turned at any operative rotational speed. In a particular feature, the rotation speed can, for example, be at least a minimum of about 5 revolutions per minute (rpm). In another feature, the drum speed can be up to about 40 revolutions per minute to provide desired performance.

The metering drum 40 can have any operative size or configuration, and can be constructed of any operative material. As representatively shown, for example, the drum can be constructed of a hardened polymer or stainless steel. Additionally the drum may have a diameter of about 46 cm, and an axial length of about 102 cm.

In a particular feature, at least one lug type member 90, such as provided by the representatively shown lug block, can be positioned and attached to a region inside the metering drum at the drum exit end 88. In a desired arrangement, the drum can include a lug system having a plurality of lug members or blocks. The radially-inward extending height 91 of each lug member (as measured from its corresponding inside surface of the metering drum) can be sized to operatively engage and isolate at least one individual metered article. In a desired aspect, the lug height 91 can be sized to be approximately equal to the thickness 35 of the articles being processed. Additionally, the longitudinal, axial length 89 of each lug member can be approximately equal to a major length dimension of the article. For example, the axial lug length 89 of each lug member can be approximately equal to the first length dimension 32 of the article 28.

As representatively shown, two drum lug members 90 may be spaced about 180 degrees apart along an inside, circumferential surface of the drum. Each lug can be arrayed and mounted along a drum region at the discharge, exit end 88 of the drum, and can be positioned substantially flush with the exit end of the drum. During rotation, each lug can catch or otherwise engage an individual metered article, and can move the metered article in association with the rotating drum wall. As representatively shown the lug member can hold the article adjacent to or against the inner wall surface of the metering drum. Other articles, which are not operatively engaged by the lug, can effectively fall away from the engaged article. The remaining engaged article can then be carried by its associated lug member 90, and delivered to a position having a height above the top of the second stationary plate member 82. The metered article can then fall or otherwise be deposited from the lug member onto an exit ramp member 43. As a result, a regular or irregular series of articles can be discharged out from the exit end 88 of the drum 40, and moved away from the metering drum.

In an alternative configuration, a vacuum commutation system may be employed to transport the articles to the discharge, exit end 88 of the metering drum. Additionally, the vacuum commutator may replace the lugs. The vacuum commutation system may allow for a more aggressive spacing and pickup.

In a particular arrangement, an exit ramp plate or other ramp member 43 can be operatively positioned to extend along an exit region at the exit end 88 of the metering drum 40, and can be configured with an operative ramp angle. The ramp member can be configured to extend an operative distance into the volume of the metering drum 40, and can be generally radially, spaced away from the inside, cylindrical wall surface of the metering drum by a selected spacing offset distance. As a result of the offset distance, the drum lugs 90 and any entrained article can move past the exit ramp 43 without excessively contacting the drum exit ramp 43. Desirably, the drum lugs and entrained article can substantially avoid contact with the exit ramp 43. In a particular feature, the ramp spacing distance can be approximately 1.5 times the thickness dimension 35 of a metered article. Once the entrained article has been carried past the level of the exit ramp 43, the article can fall or otherwise be moved off of the cooperating lug member 90 and onto the exit ramp 43.

The ramp member can be configured to catch articles that exit from the metering drum 40, and can help transfer and deposit the articles into a selected guide system. The guide system can help to selectively position and arrange the articles, and can help transport the articles to the first, take-away conveyor 50. In a particular aspect, the guide system can include a directing slide 42, and the ramp member 43 can be operatively associated with the directing slide. As representatively shown, the ramp member 43 can be operatively connected and joined to the directing slide.

During operation, the supply hopper 26 can operatively keep the metering drum loaded by feeding articles into the entry end 86 of the metering drum, as required. Individual articles 28 can be loaded into the entry end 86 of the metering drum 40, and can gradually work their way to the exit end as the drum rotates. The metering drum is configured such that a rotation of the drum helps overcome the static friction which would otherwise inhibit the desired movement of articles downstream through the drum. When the product reaches the exit end 88 of the drum, the metering lugs (or vacuum commutation system) can catch an article and bring it to the discharge, exit end 88 of the rotating drum, and can discharge the article onto the exit, ramp plate. As a result, the metering drum can rotate and deliver pouches approximately one-at-a-time onto the directing slide 42. The metering operation and system can substantially prevent an excessively large group of multiple products from being fed, all at once, onto the directing slide 42. This can reduce an undesired clogging of the input system, and improve the throughput capability of the overall operation and system.

Various sensors and controls can be employed to regulate the operation of one or more sections of the method and apparatus of the invention. In the various arrangements or aspects of the invention, any operative sensor device may be employed, and a suitable sensor may include a photo-eye detector, an electromagnetic detector, a sonic detector, a ferrous proximity detector, a luminescence detector, a vision system detector or the like, as well as combinations thereof.

Conventional sensors and controls can be employed to regulate the article input system. In the example of the representatively shown configuration, an array or other system of hopper sensors can be employed to detect and regulate the level of articles in the feed hopper 26. The hopper sensors can include a first, high-level sensor (e.g. such as provided by a first arrangement of at least one photo-eye) and a second, low-level sensor (e.g. such as provided by a second arrangement of at least one photo-eye). The first level sensor can include a first photo-eye located approximately three-quarters of the way up from the bottom of the hopper 26, and arranged to look from corner to corner along a first diagonal. The first level sensor can also include a first, complementary photo-eye located approximately three-quarters of the way up from the bottom of the hopper 26, and arranged to look from corner to corner along a second diagonal. The first level sensor can detect the level of the feed hopper to control an automatic feed of loose articles into the hopper. The first level sensor can also be used to help detect jam conditions.

The second level sensor can include a second photo-eye can be located operatively proximate a bottom discharge area of the hopper 26, and can be arranged to look across the volume of the hopper. The second sensor can be configured to detect when the hopper is empty or nearly empty, and can be configured to help to allow the method and apparatus to go into a "sleep" mode until more articles are supplied to the hopper.

A control mechanism, such as provided by a solenoid valve and an associated activation device, can be operatively located to control the opening and/or closing of the exit gate at the bottom of the hopper 26. Conventional activation devices are well known in the art, and any operative activation device may be employed. The control mechanism can be configured to maintain a sufficient quantity of articles in the metering drum, and can be configured to initiate when a sensor in the metering drum has detected a low-level condition.

It should be readily appreciated that in the various systems and components of the present disclosure, any operative activation device may be employed. Such activation devices and/or drive mechanisms may include fluidic cylinders, fluidic servos, pneumatic servos, electromagnetic servos, stepper motors, regular motors or the like, as well as combinations thereof. For example, the activation device can be provided by an array of pneumatic cylinders.

A gating switch device, such as provided by a proximity switch, can be configured to detect an open and/or closed condition of the hopper exit gate 62, and can be operatively located on the activation device that controls the opening and closing of the hopper exit gate. The switch can also help to verify that the gate has appropriately opened or closed, or to provide other desired feedback information.

A metering drum sensor, such as provided by a photo-eye, can be configured to detect a low-level condition in the metering drum 40 or other metering device. The drum sensor can, for example, be arranged to look through the metering drum and observe between the stationary plates at the entry and exit ends of the metering drum. The drum sensor can check the level of articles present in the metering drum, and can be used to trigger an additional flow of articles into the metering drum.

A complementary drum sensor, such as provided by a complementary photo-eye, can be configured to detect a very-low-level condition in the metering drum 40 or other metering device. The complementary drum sensor can be configured to look through metering drum and observe between the lower, bottom regions of the stationary plates at the entry and exit ends of the metering drum. The complementary drum sensor can check for a very low, nearly-out condition of the metering drum, and can help provide an additional aspect of metering control.

An operative drive mechanism, such as provided by an electric motor with a variable-speed or fixed-speed drive, can be employed to rotate the metering drum 40. The drive mechanism can be mounted operatively proximate the metering drum to spin the drum at a desired rotational speed.

The drive mechanism can help control to regulate a rate at which articles are deposited onto the directing slide 42. The variable speed control can help control the speed and reliability of the inputting system, although it is not required for operation.

A speed switch device, such as provided by a mechanism which includes a proximity switch, can be incorporated to select and enable a slow-speed rotation of the metering drum. The speed switch mechanism can be mounted operatively proximate to an outer surface of the metering drum 40, and can be configured to be triggered by flag mechanism, such as provided by a metallic flag. The flag can be placed at any operative location on the metering drum, and can help provide an ability to switch to a different speed set-point. The different speed set-point can help provide a variable speed profile which may provide additional throughput capability.

Figure 4:
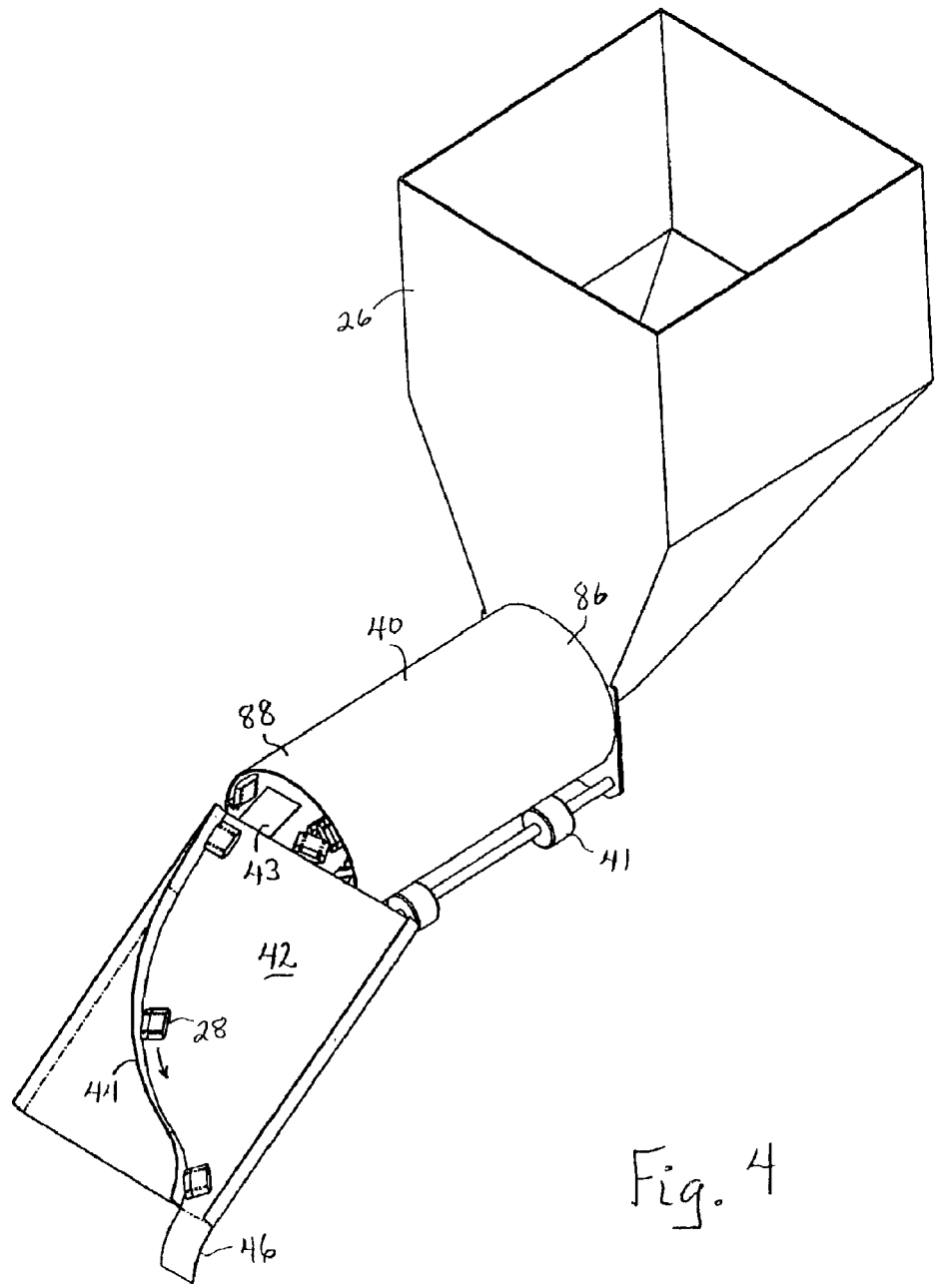
FIG. 4 representatively shows a schematic, perspective view of the metering section and a directing or guide system that can be employed in the method and apparatus of the invention.

The article guide system or section of the method and apparatus can operatively rearrange and transfer the articles to the first conveyor 50. The guide system can be configured to properly and consistently arrange the articles 28 into an article lay-out position and can selectively arrange the articles for a desired processing by an article alignment system. With reference to FIGS. 2, 4 and 4A, a particular aspect of the guide system can include an inclined directing slide 42, and the slide can include an associated, article-side, guide surface which contacts or otherwise engages the articles 28. The guide surface may be substantially flat or may be curved, as desired. In a particular arrangement, at least a portion of the guide surface can present a convex, article-facing surface for contacting or otherwise engaging the articles 28. Moving the articles onto and over the guide surface can operatively lay or otherwise place each individual article onto a major facing surface of the article. In the shown arrangement, for example, the article 28 can have one or more substantially flat and/or curved facing surfaces 30, 30a, and the directing slide 42, in cooperation with gravity, can operatively cause the article to lay onto one such facing surface. The directing slide 42 can be constructed of any material that has an operatively low coefficient of friction which allows each individual article to lay-down onto a major facing surface of the article. For example, the directing slide can be constructed with a polished stainless steel surface to provide long-term rigidity and long-term durability of the smooth low-friction surface. The directing slide 42 can be mounted at any operative slide angle 92 sloping downward from the drum metering unit 40 (e.g. FIG. 4A). The slide angle can be configured large enough to adequately overcome static-friction forces, and small enough to avoid an excessive speed of the articles when the articles are transferred to the conveyor 50. In a particular feature the slide angle 92 can be at least a minimum of about 30 degrees, as measured from the local horizontal. The slide angle can alternatively be at least about 50 degrees, and can optionally be at least about 55 degrees to provide improved performance. In other aspects, the slide angle 92 can be up to a maximum of about 85 degrees, or more. The slide angle can alternatively be up to about 70 degrees, and can optionally be up to about 60 degrees to provide improved effectiveness.

The slide angle 92 can be non-constant or substantially constant along the movement direction of the articles to provide a desired control of the article transfer speed. For example, the slide angle can be greater at a region of the directing slide that is proximate the metering device (e.g. metering drum 40), and can be relatively smaller at a region of the directing slide that is proximate the conveyor 50. In a particular arrangement, the directing slide 42 can be mounted to provide a slide angle of about 50 degrees, at least in the region of the directing slide that is proximate the drum exit end 88. This angle can provide a good balance of the ability to overcome static forces and the ability to control transfer speed. An excessively steep inclination of the slide angle 92 can create more potential for an undesired tumbling of the articles.

Sidewall members 45 can be connected and configured to help position and maintain the articles 28 on the article-side surface of the directing slide. Additionally, a guide member 44 can be operatively joined to the guide surface of the directing slide 42, and the guide member can, for example, include an operative, guide rail or guide fence. The guide member can be a generally up-standing mechanism, and can be configured to extend along a curvilinear, serpentine path. In a particular feature, the guide member can be constructed to incorporate and form an effective, funnel curve. As a result, the guide member 44 can form an operative funnel shape which can more effectively channel each individual article 28 to a selected delivery region onto the first conveyor 50.

The guide member can present a flat and smooth, low-friction surface to the articles, and can be configured to follow a generally S-shape profile. As representatively shown, the guide member profile can include an initial, slightly tapered drop from the exit end 88 of the metering drum 40, and can then include a relatively gentle (larger radius) concave, "inside" curve followed by a relatively aggressive (smaller radius), oppositely bending, convex, "outside" curve which can help to sequence the articles and allow a controlled drop-off into the take-away conveyor 50. The guide-fence profile can more effectively provide a consistent guide path for the articles to follow as the articles are being repositioned on the slide. The guide fence can also funnel each article to a consistent delivery region for transfer to the first conveyor 50. In a particular arrangement, the guide member profile, along its "inside" curve, can be configured to have a radius of curvature which is about four times the largest length dimension (e.g. four times the length dimension 32) of the transported article. Along the "outside" curve of the guide member, the guide member profile can be configured to have a radius of curvature which is about 1.5 times the largest length dimension of the transported article. While the described arrangement represents a desired, operative configuration, it should be appreciated that a guide member profile having other radius combinations may also be employed to operatively provide an effective mechanism and technique for transporting the articles 28. The radii of curvature employed by the guide member profile should be configured such that the articles being transported do not stall on the directing slide 42 and maintain sufficient momentum to pass the discharge end of the directing slide. The selection of the radii of curvature can depend upon the frictional properties of the article, of the directing slide, of the guide member. The selection of the radius combination can depend upon the magnitude of the inclination angle 92 of the slide 42. Generally speaking, any combination thereof which allows for consistent delivery of said article to a singular delivery point at the discharge of the slide will allow system operation.

The conveyor 50 can operatively transport the selectively positioned article from the directing slide 42 to an article alignment system. Additionally, the first conveyor 50 can be provided by any operative conveyor mechanism. For example, the conveyor 50 may be provided by a conventional, vacuum take-away conveyor.

The take-away system can include a tapered, transfer guide ramp mechanism 46 which can operatively provide a path profile for transferring articles onto the take-away conveyor 50. In a particular feature, the guide ramp 46 can provide a substantially smooth contour between the slide 42 and the transition point onto the take-away conveyor 50. The contour can help ensure that the articles are directed immediately to the take-away conveyor without stalling.

The guide ramp 46 can work in cooperation with an article stop plate mechanism 48. The stop plate 48 can provide a surface to catch articles moving from the directing slide 42, and can "kick" or otherwise help to direct and arrange the articles onto the first, take-away conveyor 50. The take-away conveyor 50 can operatively "grab" or otherwise actively engage the articles that enter the first conveyor, and can move the articles away from the directing slide 42 at high speed. The representatively shown vacuum conveyor configuration can provide for an improved control of the articles at the take-away point at the article exit from the directing slide 42. The vacuum feature is optional, but the resulting, positive take-away operation afforded by the vacuum feature can advantageously help provide a higher system speed. Desirably, a relatively strong vacuum of about 25.4 cm (10 inches) of mercury can be provided to the vacuum take-away conveyor. The strong vacuum can help provide more repeatable performance, and help make the method and apparatus more robust and less sensitive to the shape and contour of the transfer ramp 46.

As representatively shown, the first conveyor 50 can be configured to engage an edge region 36 of each article, and can be configured to provide a standing, on-edge arrangement of each article. An operative system of guide rails 52 can be employed to help maintain the desired on-edge arrangement of the articles 28. The selected articles 28 may or may not have first and second article dimensions 32 and 34, respectively, that are substantially equal. Where the first and second article dimensions are unequal, there can be a preference for identifying a relatively longer first dimension 32 of the article, and operatively aligning the first dimension 32 along a corresponding local machine-direction 22 of the method and apparatus.

As representatively shown, the first conveyor 50 can be configured to transport the articles 28 to an operative alignment device or system which can arrange the articles in a desired, consistent shape placement. With reference to FIGS. 2, 5, 5A and 6 an operative alignment mechanism can process selected articles with a turning system to thereby rotate or otherwise arrange the selected articles to operatively align the article first dimension 32 of the selected articles along the machine-direction 22. The processing of the selected articles can include a turning of the selected articles with a turning member. The turning of the article can include a direct-contact engagement, or a substantially non-contact engagement, as desired. The turning member can include any operative mechanism, such as knock-down bar, a low grabbing momentary nip apparatus or the like, as well as combinations thereof. In a particular aspect, the turning member can include a curved or otherwise inclined entry region thereof. In a further aspect, the turning of the selected articles can include an engaging of the selected articles with a curved ski member 58. The turning ski can be configured to operatively knock-down any articles that are standing with their long, first dimension 32 aligned generally up-and-down, approximately along the local vertical direction. As a result, substantially all of the articles 28 can be operatively aligned with their longer, first dimension 32 extending along the machine-direction 22. The tapered entry region of the turning ski can help to provide a gradual, entry transition, and can help prevent jams from occurring during the turning operation. The turning system can also include a bottom catch plate 56, which can be configured to help maintain a desired height alignment of the articles, and help prevent the articles from unintentionally leaving the production process flow. The turning ski 58 can, for example, be composed of stainless steel, and can have a composition which includes hardened polymers, aluminum or other type alloys, as well as combinations thereof.

The article alignment system can include a cooperating second conveyor 54, and the second conveyor can be configured to accept articles transferred from the take-away conveyor 50. In a particular aspect, the second conveyor 54 can be configured to transport the articles to and/or from the turning system. Any operative transporting mechanism can be employed to provide the second conveyor 54. For example, the second conveyor can include a side-by-side nip belt system. The second conveyor 54 is desirably configured to run at a second conveyor speed which is operatively faster than a first conveyor speed provided by the first conveyor 50. The resulting, differential increase in speed can help ensure that there is a selected spacing distance between successive articles. The spacing distance can help allow sufficient space/time for positional changes at the product turning ski, and can help allow adequate space/time for other subsequent operations.

Figure 6:
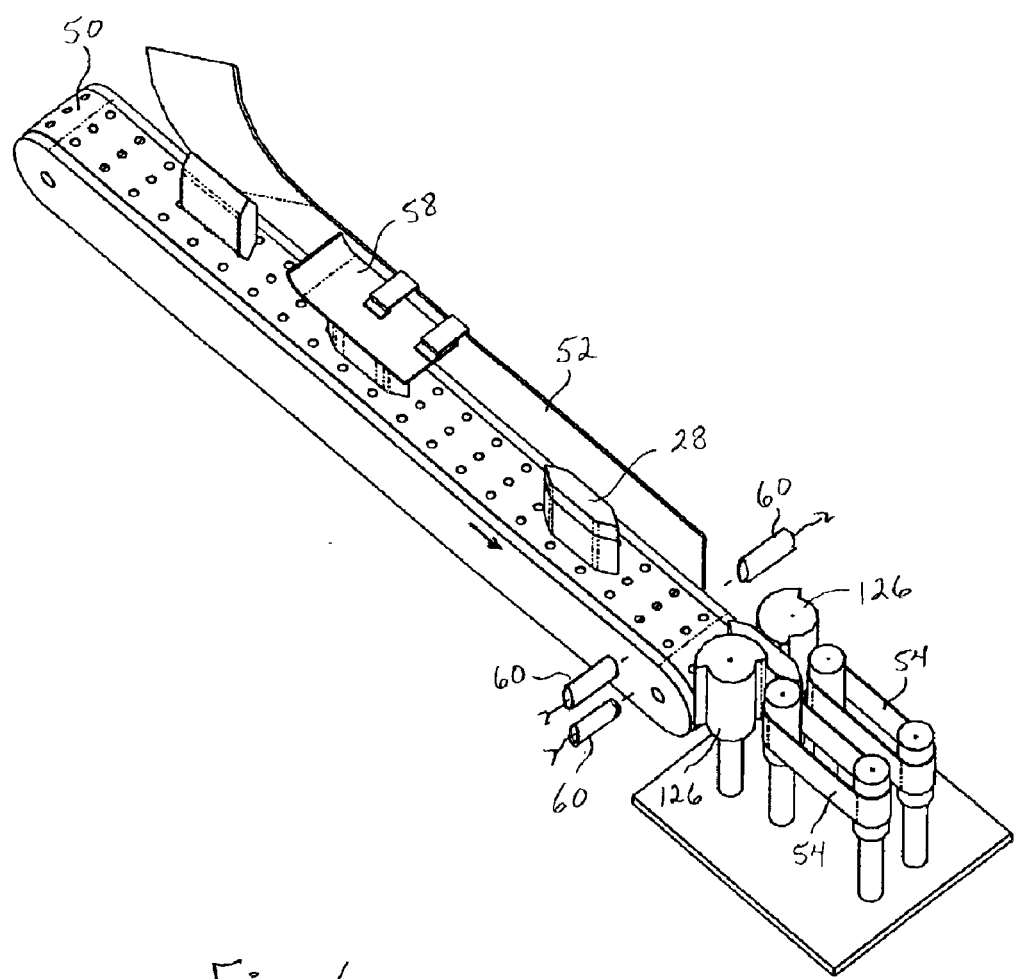
FIG. 6 representatively shows a perspective view of an alignment section and sequencing section that can be employed with the present invention.
Figure 6A:
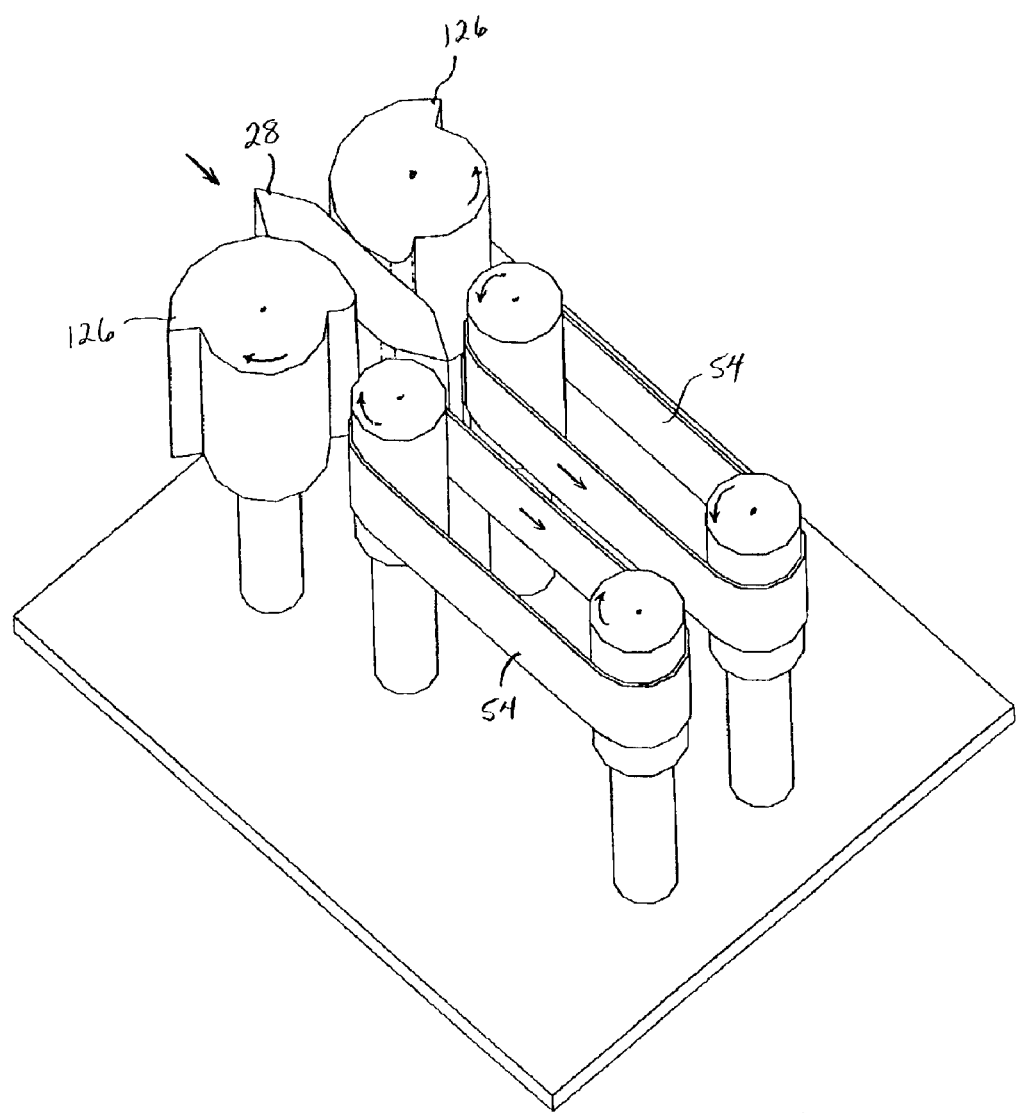
FIG. 6A representatively shows an enlarged, perspective view of a sequencing section that employs a system of lobed-cams.

A further feature of the method and apparatus can include a system of cooperating, counter-rotating, lobed-cam rollers 126, as representatively shown in FIGS. 6 and 6A. The lobed-cams can be positioned relatively upstream from the selected orienting system (e.g. upstream from the selected system of twist-belts), and may be located relatively upstream from the second conveyor 54. The system of lobed-cams 126 can be configured to provide a desired, spaced-apart sequencing of the articles 28 into the employed orienting system. As representatively shown, each lobed-cam has a portion with a relatively larger radius, and a portion with a relatively smaller radius. The larger-radius portions of the cooperating cams are configured and coordinated to form a nip region therebetween which can operatively engage and move an article 28. The smaller-radius portions of the cooperating cams are configured and coordinated to form a nip region therebetween which can substantially avoid engaging and moving an article 28. As a result, the system of lobed-cams 126 can engage and move an article 28 with an intermittent, spaced-apart sequencing.

The operation of the lobed-cams 126 can be coordinated with the transition time period needed to move an individual article through a rotational conveyor (e.g. a set of twist-belts). More particularly, the lobed-cams can rotate once per each desired transition period to assist in the metering of articles into the rotational conveyor system. This will help to insure that each article is metered and delayed until the preceding article has been successfully transferred to a subsequent, relatively downstream conveyor or other processing operation. The lobed-cam system can act as both a brake and a sequencer to ensure that the rotation conveyors have sufficient time to complete their controlled delivery of articles, and to complete any needed indexing movement. It should be readily appreciated that the rotational speed of the lobed-cams and/or the circumferential extent of the larger-radius, lobed portions of the cams can be appropriately configured to provide the desired metering operation.

Figure 8:
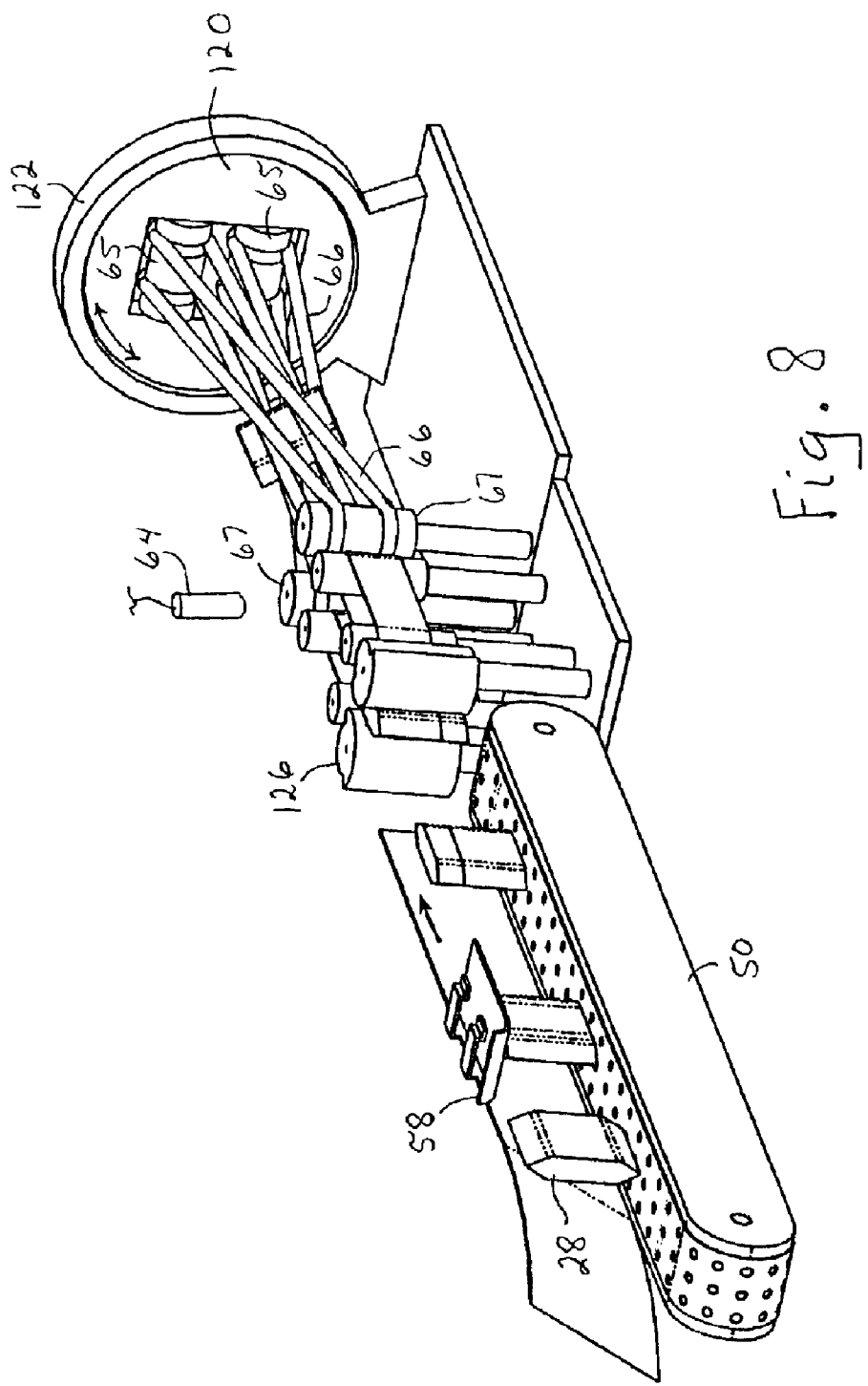
FIG. 8 representatively shows a schematic, perspective view of an alternative orienting section that employs an indexing carriage provided by an indexing wheel.

In a further aspect, the method and apparatus can include a mechanism or system for identifying appointed end-articles 72 of each article-set 70 (e.g. FIG. 8). An additional aspect can include an identifying of a presence of an appointed datum surface 74 (e.g. FIG. 6) with respect to each end-article 72. Still another aspect can include an identifying of a desired packaging face-alignment of the datum surfaces 74 of the end-articles 72 of each article-set 70.

The identifying of the desired, packaging face-alignment of the datum surfaces of the end-articles can include a detecting of a presence of a marker or other predetermined indicator 76 (e.g. FIG. 1). For example, the indicator may be a fold on an outer surface of the article, a material-overlap region on the outer surface of the article, packaging marks on the article, optical markers, magnetic markers, electronic markers, electro-magnetic markers or the like, as well as combinations thereof. In the representatively shown arrangement, for example, the indicator can be a region of adhesive, and the method and apparatus can include a detecting the presence of the adhesive. While this aspect of the method and apparatus is optional, it may be important where an adhesive buildup may disrupt later processing operations and degrade reliability.

The detection of the adhesive or other selected indicator can occur after the alignment operation, but may alternatively occur prior to the alignment operation. Additionally, the detection of the selected indicator can be employed in conjunction with an operative control system to determine any rotational adjustments that may be required for particular articles.

One or more regions of each article may optionally be examined for the presence of the selected indicator, and the detecting of the presence of the predetermined indicator can employ any operative arrangement of one or more indicator sensors. As representatively shown, each article can be examined to identify a presence or absence of the indicator and its corresponding datum surface 74. The examination can occur before or after the articles have been turned to a consistent, desired shape-position, and the articles may be examined for an indicator (e.g. adhesive) that is present on only one, major side surface of each article.

In a particular feature, an array of the indicator sensors 60 can be configured to detect the position of the indicator on each end-article, such as the position of an adhesive on a major facing surface of each end-article. In the representatively shown arrangement, for example, the adhesive may include an optical brightener, and the sensor can include at least one optical sensor 60 that can operatively detect the brightened adhesive. The optical sensor may, for example, by a luminescence sensor. In a further aspect, the sensor arrangement can include a system of two or more luminescence sensors or other indicator sensors 60.

Based on the positional information provided by the indicator sensor(s), an orienting system can be configured to provide a selective repositioning of any end-articles that require an orienting adjustment. The orienting system can thereby provide the desired face-alignment of the datum surfaces of the end-articles of the corresponding article-set. In a particular feature, the orienting system can rotate or otherwise move a selected, out-of-position article to a desired, rearranged directional orientation.

In a desired aspect, the orienting system can be configured to identify an individual end-article that needs to be rearranged, and to appropriately rotate or otherwise reorient the identified end-article to place a datum surface (e.g. an adhesive-bearing surface) of the end-article toward an interior or exterior of its corresponding article set. For example, the adhesive-bearing datum surface of the end-article can be processed to have an inward, facing direction, relative to the associated article-set, and an opposite non-adhesive-bearing surface of the end-article can be processed to have a relatively outward, facing direction.

After the articles have been knocked down or otherwise processed by the alignment system (e.g. turning ski 58), the articles may be transferred to a secondary side-by-side nip conveyor, There can be a gap space through which the articles are handed-off to the secondary conveyor, and the space can allow a sensor system to detect the selected indicator and identify the orientation of the datum surface of each article. For example, a detection of adhesive can be accomplished by employing a system of luminescence sensors. In a desired arrangement, three sensors 60 can be mounted in the gap space, looking at the top and bottom half of both sides of the product. While only two sensors are needed, up to four or more sensors may be employed to provide improved reliability and accuracy.

After the articles 28 have been knocked-down or otherwise turned, the articles can optionally be transferred to the orienting system. Any operative orienting system may be employed. The orienting system is configured to selectively reposition or otherwise rearrange particular, identified articles to a predetermined position. In a particular aspect, the orienting system can be configured to rotate the identified articles through a predetermined amount of angular rotation. The direction of the rotation can be determined by the control system based on the detection data provided by the indicator sensor arrangement.

With reference to FIGS. 7, 8, 9 and 9A, the orienting system can include a rotational conveyor system with a suitable conveyor drive system. The rotational conveyor system can be configured to provide a selective rotating or twisting of the selected articles (e.g. the end-articles 72) for which a desired reorientation has been identified. In a particular feature, the orienting system of the method and apparatus can be configured to generate a desired twist motion and displacement by rotating the selected article about a twist axis that is aligned generally parallel to the local machine-direction. As representatively shown, an operative rotating of the identified end-articles can be provided by a device which includes a twist-belt system, and the twist-belt system can include at least a first set of cooperating twist-belts 66. Additionally, the orienting system may further include at least a second set of cooperating twist-belts 68.

Each individual set of twist-belts can include at least one cooperating pair of face-to-face, counter-recirculating belt members that move on associated belt rollers (e.g. FIG. 7). Optionally, an operational set of twist-belts can include two or more cooperating pairs of face-to-face, counter-recirculating belt members (e.g. FIG. 8). In their various configurations, each of the pairs of twist-belts can be cooperatively driven to move at a suitable belt speed. In desired arrangements, the cooperating pairs of twist-belts are operatively driven to move approximately equal belt speeds. The counter-recirculating belt members can form therebetween an extended nip region that can operatively engage and carry the articles 28 along the method and apparatus. Each cooperating belt-pair can be configured to impart a desired amount of translational and rotational movement to an article that enters and moves along the local machine-direction through the extending nip region that is provided between the pair of face-to-face belts.

With reference to FIG. 7, a first configuration of twist-belts (as representatively shown by the first set of twist-belts 66) can be configured to displace and rotate an article in a first twist direction, and a second configuration of twist-belts (as representatively shown by the second set of twist-belts 68) can be configured to effectively displace and rotate an article in a second twist direction that is substantially opposite the first twist direction. The first set of twist-belts 66 can, for example, be configured to rotate or twist an identified article (e.g. an end-article 72) in a generally clockwise direction through a twist angle of about 90° (where such angle is determined relative to a beginning orientation of the article when the article enters into the first set of twist-belts). The second set of twist-belts 68 can be configured to rotate or twist an identified end-article in a generally counter-clockwise direction through a twist angle of about 90°. As illustrated, for example, each set of twist-belts can be configured to accept an article in a generally standing-up position, and rotate the article approximately ±90° (plus or minus 90°) to a generally flat-out, output feed position.

In a particular aspect, the selective orienting (e.g. rotating) of the appointed articles (e.g. end-articles 72) can include a selective indexing between predetermined sections of the employed, rotational conveyor system (e.g. between the first and second sets of twist-belts 66, 68). To provide the indexing, the method and apparatus of the invention can include a carriage system, such as a system which includes the representatively shown shuttle carriage 94 and carriage traversing rails 95. In a particular configuration, the sets of twist-belts (or other rotational conveyors) can be operatively connected and attached to a mounting plate, and the mounting plate can be secured to the shuttle carriage 94. Where the two sets of twist-belts are configured to provide opposite rotations of the selected end-articles, the carriage can be operatively indexed to traverse back-and-forth on the carriage rails 95, as needed to provide the desired orientation of the selected end-article.

The shuttle carriage can selectively operate so that the articles 28 can exit the article alignment system (e.g. such as provided by the system that includes the turning ski 58) and enter each section of the rotational conveyor system, substantially without changing or diverting from the article's original exit path. In a particular feature, the shuttle carriage can be configured to stay in position until the rotational conveyor has delivered an individual product to a subsequent, downstream stacker conveyor. When desired, the carriage can move and index to its other predetermined position to provide a reversed rotation of an identified article.

A braking mechanism, such as provided by a small brake plate, may be employed at the in-feed entry region of the rotational conveyor system to allow sufficient time for transitioning between the predetermined index positions. This plate can have a flat surface and can extend across a gap between the sections of the rotational conveyor (e.g. the sets of conveyor twist-belts 66, 68) and the preceding portion or component of the method and apparatus.

Figure 9:
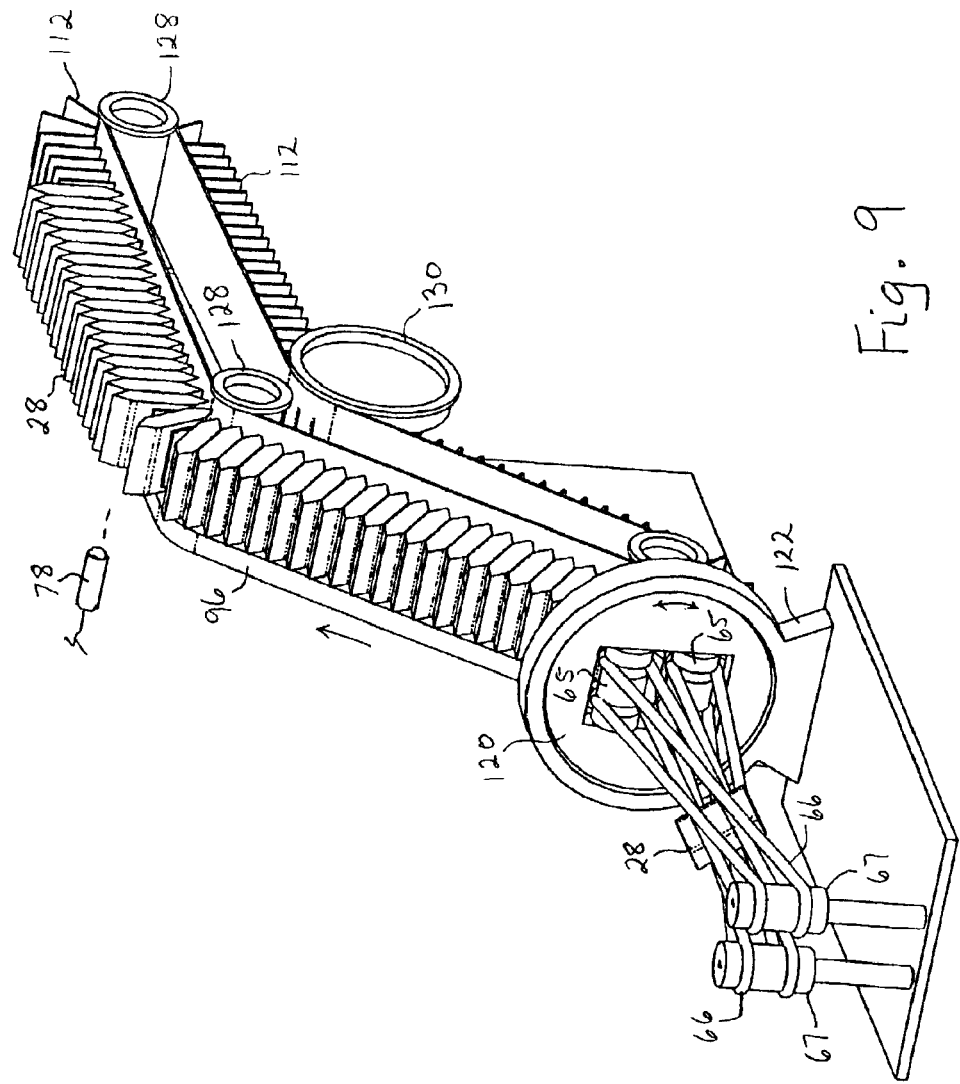
FIG. 9 representatively shows a schematic, perspective view of a stacking section that can receive articles from an orienting section.
Figure 9A:
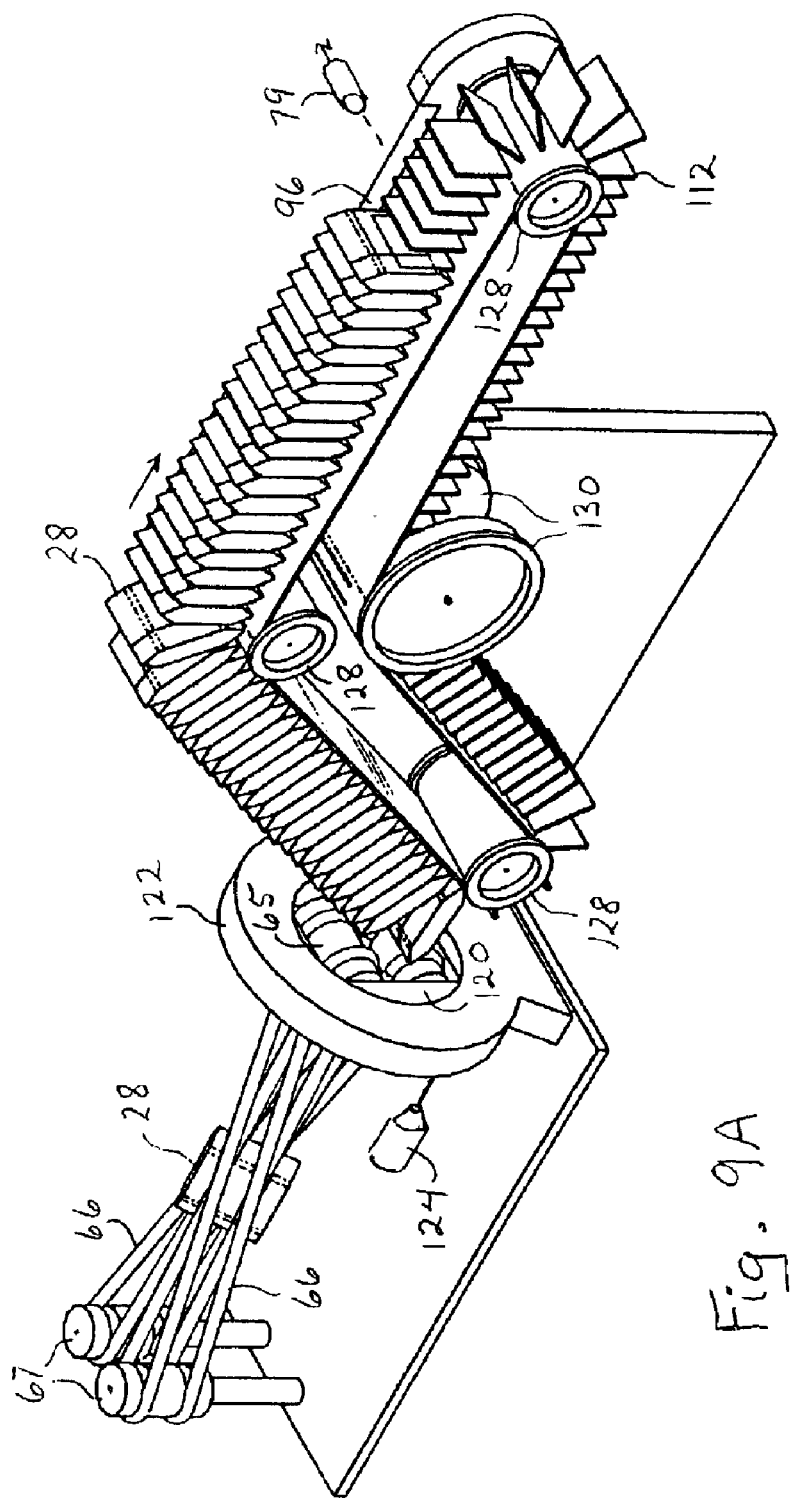
FIG. 9A representatively shows another schematic, perspective view of the stacking section that can receive articles from the orienting section.

With reference to FIGS. 8, 9 and 9A, the selective orienting (e.g. rotating) of the end-articles can alternatively include a selective indexing operation conducted with an individual, single set of cooperating twist-belts 66. To provide the indexing, the method and apparatus of the invention can incorporate a carriage mechanism that includes a rotatable indexing wheel 120. The indexing wheel 120 can provide and have a first position which operatively configures the set of twist belts 66 to rotate an article in a first rotational direction. Additionally, the indexing wheel can provide and have a second position which operatively configures the set of twist belts 66 to rotate an article in an opposite, second rotational direction.

The indexing wheel can be supported in a frame 122 and rotatably mounted therein. In a desired aspect, the indexing wheel can have an axis of rotation that is aligned generally parallel to the local machine-direction. The indexing wheel 120 can be operatively driven and actuated to selectively oscillate or otherwise traverse back-and-forth through a wheel, angular movement which is from about +90 degrees to about −90 degrees (about ±90°). As a result, the total range of the angular movement of the indexing wheel can be approximately 180 degrees. Any suitable drive mechanism 124 can be operatively connected to actuate the indexing wheel through the desired amount and direction of movement. For example, the drive mechanism 124 can be configured to operatively engage a circumferential region of the indexing wheel 120. Additionally, the circumferential region of drive engagement can extend along a peripheral section of the indexing wheel. In particular arrangements, for example, a belt-drive, gear-drive, chain drive, clutch-drive, hydraulic-drive or the like may be configured to operatively engage a circumferential section or other suitable section of the indexing wheel. It should be readily appreciated that other operative drive configurations may alternatively be employed, as desired.

The associated twist-belt system 66 is operatively connected to the indexing wheel 120. In a particular configuration, the twist-belt system can include a substantially stationary (substantially non-translating) set of rotatable belt rollers 67, and a movable (selectively translating) set of rotatable belt rollers 65. The stationary set of belt rollers can desirably be located at an entry region of the orienting system. The movable belt rollers 65 can be operatively mounted on and attached to the indexing wheel 120, and can be arranged to operatively position the belt nip region along a center region of the indexing wheel. As illustrated, the indexing wheel can include a generally central, wheel opening which extends through the axial thickness of the indexing wheel. The rollers 65 can be suitably mounted in the wheel opening, and the oriented articles can be passed along the local machine-direction and through the wheel opening for further processing. The illustrated wheel opening has a generally rectilinear shape, but any other operative shape may alternatively be employed, as desired.

In the representatively shown position of the indexing wheel 120 (e.g. FIG. 8), the indexing wheel and the connected array movable of movable rollers 65 are arranged to impart a counter-clockwise twist to an article to thereby turn the article through a counter-clockwise twist angle of about 90°. When desired, the indexing wheel can be selectively repositioned by operatively traversing the wheel through a rotational angle of about 180° (e.g. clockwise or counter-clockwise, as appropriate to avoid tangling the belt set). Accordingly, the indexing wheel and the connected array movable of movable rollers 65 can be rearranged to impart a desired clockwise twist to an article which can thereby turn the article through a clockwise twist angle of about 90°.

The exit from the employed twist-belt system can be configured to feed a third, stacker conveyor 96, and the third conveyor can include any operative mechanism. In the shown arrangement, for example, the third conveyor 96 can include a lug-style, paddle chain conveyor system. The stacker conveyor can alternatively include other known, conventional conveyor systems and devices.

An operative system of sensors and controls can be employed to regulate the article directing system, the first conveyor system and the article alignment system. In the representatively shown arrangement, for example, a directing slide jam-detect sensor, such as provided by a photo-eye, can be located at the bottom the directing slide 42, and can be arranged to observe across the delivery region at the exit end of the directing slide. The sensor can detect a jam condition and can be arranged to cause the metering drum to stop moving until the jam is cleared. For example, a blow-off air blast system may be employed to break apart and remove the jammed condition.

An electric motor with a variable speed drive can be operatively connected to drive the product take-away vacuum conveyor 50. In a particular arrangement, the drive motor can be located at or near the bottom of the directing slide 42. The take-away conveyor can capture and transfer each article 28 from the discharge end of the directing slide, and carry each article to the in-feed region the product turning mechanism 58. The variable speed drive can selectively adjust the speed of the conveyor 50 to help optimize the operation of the method and apparatus. A turning system, jam sensor, such as provided by a photo-eye, can be configured to detect a jammed condition in the turning device. The jam sensor can, for example, be located at the pad turning ski 58, and arranged to observe across the conveyor 50 along the local cross-direction 24.

An operative system of sensors and controls can also be employed to regulate the article orienting system. In a particular aspect, a metering brake system, such as provided by a mechanism which includes a solenoid with an associated cylinder, can be located at an in-feed region to the rotation conveyor system. The solenoid can, for example, be employed to assist a geared-in, rotational helper finger. The rotation of the helper finger or kicker can be coordinated with the transition time period needed to move an individual article through a rotational conveyor (e.g. a set of twist-belts). More particularly the helper finger can rotate once per transition period to assist in the metering of articles into the rotational conveyor system. This will help to insure that each article is metered and delayed until the preceding article has been successfully transferred to the stacker conveyor 96. The kicker, metering system can act as both a brake and a sequencer to ensure that the rotation conveyors have sufficient time to complete their controlled delivery of articles.

A rotational conveyor servo motor can be mounted to a rotation conveyor drive frame, and can be operatively connected to control the speed of the rotation conveyors (e.g. the twist-belts 66, 68). Additionally, a carriage actuator can be operatively connected to the mechanism that switches and transitions the shuttle carriage 94 between its appointed index positions. The carriage actuator may be any operative activation device, and may include any operative activation device set forth in the present disclosure. For example, the activation device can be provided by a shuttle drive motor.

A positive-over-travel proximity switch can be located on the indexing carriage system (e.g. shuttle carriage 94, or indexing wheel 120) to protect against equipment damage. Similarly, a negative-over-travel proximity switch can be located on the carriage system to protect against equipment damage. A home proximity switch can be located on the carriage system to provide a set reference for the carriage mechanism.

A stacker registration in-feed sensor 64, such as provided by a photo-eye, can be located on the rotational conveyor system (e.g. twist-belts 66) to detect a registered input position of an article being delivered to the stacker conveyor 96. The in-feed sensor 64 can detect and help move the stacker conveyor to dynamically capture incoming articles at predetermined locations in the stacker conveyor. If the rotational conveyor system includes more than one set of twist-belts, additional in-feed sensors may be employed, as desired.

An article rotation, jam detect sensor, such as provided by a photo-eye, can be located at exit region of the rotational conveyor system. This sensor can be configured to detect a jam condition that may occur at the region between the exit from the rotational conveyor system and the in-feed to the stacker conveyor 96.

A stacker-not-ready, diverter system can be located at the in-feed to stacker conveyor. The diverter system may include a pneumatic blow-off mechanism positioned proximate the exit of rotational conveyor system. The diverter system can operatively remove or blow-off any incoming articles that would require a movement of the stacker when the stacker is not in a safe condition for movement. The diverter system can also be configured to work in cooperation with the exit jam detect photo-eye that is proximate the in-feed to the stacker conveyor 96.

An arrangement of indicator sensors 60 can be located before the in-feed to the rotational conveyor system. In a particular feature, the sensor arrangement can, for example, be located proximate a small space that is present between the hand-off from the second conveyor 54 to a subsequent orienting system. The sensor arrangement can be mounted in this gap space, and can be configured to look at the top and bottom half of both sides of the product. Only two sensors are needed, although up to four sensors may be used. The detected presence of adhesive provides data as to how the article is oriented. The control system can be configured to use this data and determine which direction, if any, the product rotation conveyors should rotate to properly deliver the product. For example, the article may be a pouch having a folded and adhered section. The indicator sensor (e.g. adhesive sensor) can look for the position of the fold and help the process control system adjust and select the configuration of the rotational conveyors needed to provide a desired, packaging face-alignment of the articles 28.

The method and apparatus can further include a system for arranging of the articles 28 into a desired stacking configuration. At least one article-set 70 can be identified and accumulated, and a formed article-set can contain a selected number of the articles 28. Additionally, the selected number of articles can be arranged into a stack or other arrayed configuration suitable for packaging.

A stacking section of the method and apparatus can employ any operative stacking technology. As representatively shown in FIGS. 9 through 11C, the stacking system can receive articles from the rotational conveyor system (e.g. twist-belts 66, 68) and can transport the articles to a subsequent package or bag loading section. When sufficient articles for a predetermined row or other article-set are delivered to a discharge region of the stacker system, the article-set can be moved to a transfer pusher staging section. The staging section can include a pusher mechanism 98, such as provided by an overhead pusher, can move the stacked articles out of the stacker, conveyor 96 and into an automatic packaging or bagger loader section of the manufacturing process.

In a particular aspect, the stacker conveyor 96 can be arranged to receive the articles 28 in a laid-down, generally flat orientation, and to transport the articles to the entry region of the transfer pusher mechanism 98. In another feature, the conveyor 96 can be constructed to include a holding mechanism, such as provided by lugs, fingers, paddles, buckets or the like. As representatively shown, the method and apparatus may include a system of one or more paddles or fingers 112 which can accept an individual article with a generally flat transfer area. Such a transfer area can allow the individual article to be smoothly transferred into and out of the fingers. A selected "pitch" spacing can also be incorporated between the articles 28 to allow a non-captured take-up on the return path of the conveyor 96. This arrangement can help improve the adaptability and efficiency of the method and apparatus.

The stacker conveyor 96 can be controlled in a well known, conventional manner that is based upon the speed of the in-feed conveyor (e.g. twist-belts 66, 68), coupled with a sensor which detects the presence and position of an incoming article relative to the in-feed conveyor speed. When an article is detected, the drive system can advance the stacking conveyor 96 by a predetermined increment to receive the article, and then advance the conveyor 96 an additional increment for each successive article that is detected.

In a desired configuration, the stacker conveyor 96 can be arranged to provide a stacker speed that is at least a minimum of about 30 articles per minute. In a particular feature, the stacker speed can be up to a maximum of 100 articles per minute, or more. Other features can include a stacker speed within the range of about 50–100 articles per minute.

To provide a more portable and efficient design, the stacking conveyor can be configured to substantially avoid an undesired "capture" the final packaging machinery or other downstream equipment. As a result, the stacking conveyor can substantially avoid an undesired encircling or surrounding of a substantially fixed portion of the cooperating downstream equipment (e.g. packaging machinery) that has been substantially permanently installed. Accordingly, the stacking conveyor should not need an excessive amount of disassembly or separating-apart to move the method and apparatus of the invention to another, alternative location. The final packaging or bagging equipment can be stationary and substantially permanently mounted, while the accumulation system and associated stacking device of the invention can be relatively mobile and portable. Such a configuration can allow a more flexible and more efficient utilization of the method and apparatus of the invention. Additionally, the stacking conveyor 96 can be configured to remain in a substantially stopped condition whenever it is determined that a movement of the stacking conveyor would interfere with the operation of the overhead product transfer pusher 98.

Figure 10:
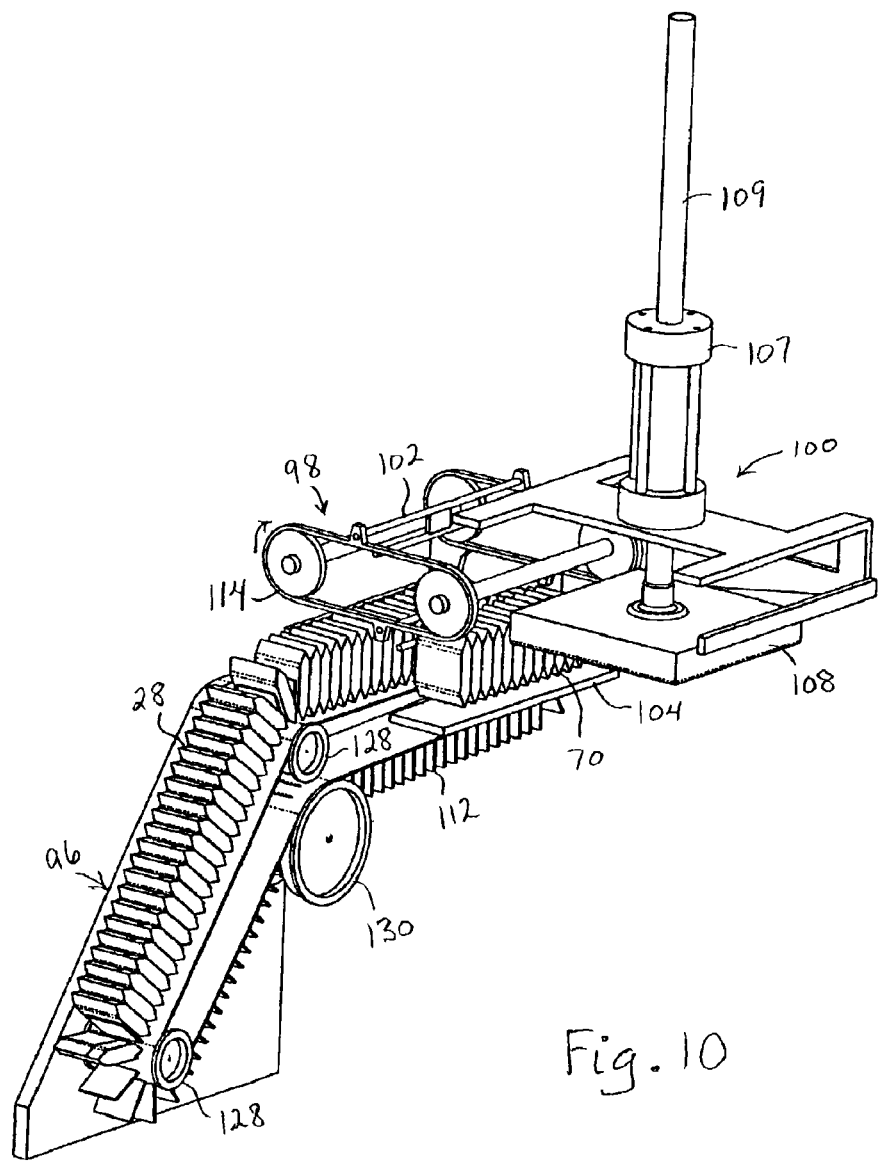
FIG. 10 representatively shows a schematic, perspective view of a loading section that can receive articles from the stacking section.
Figure 10A:
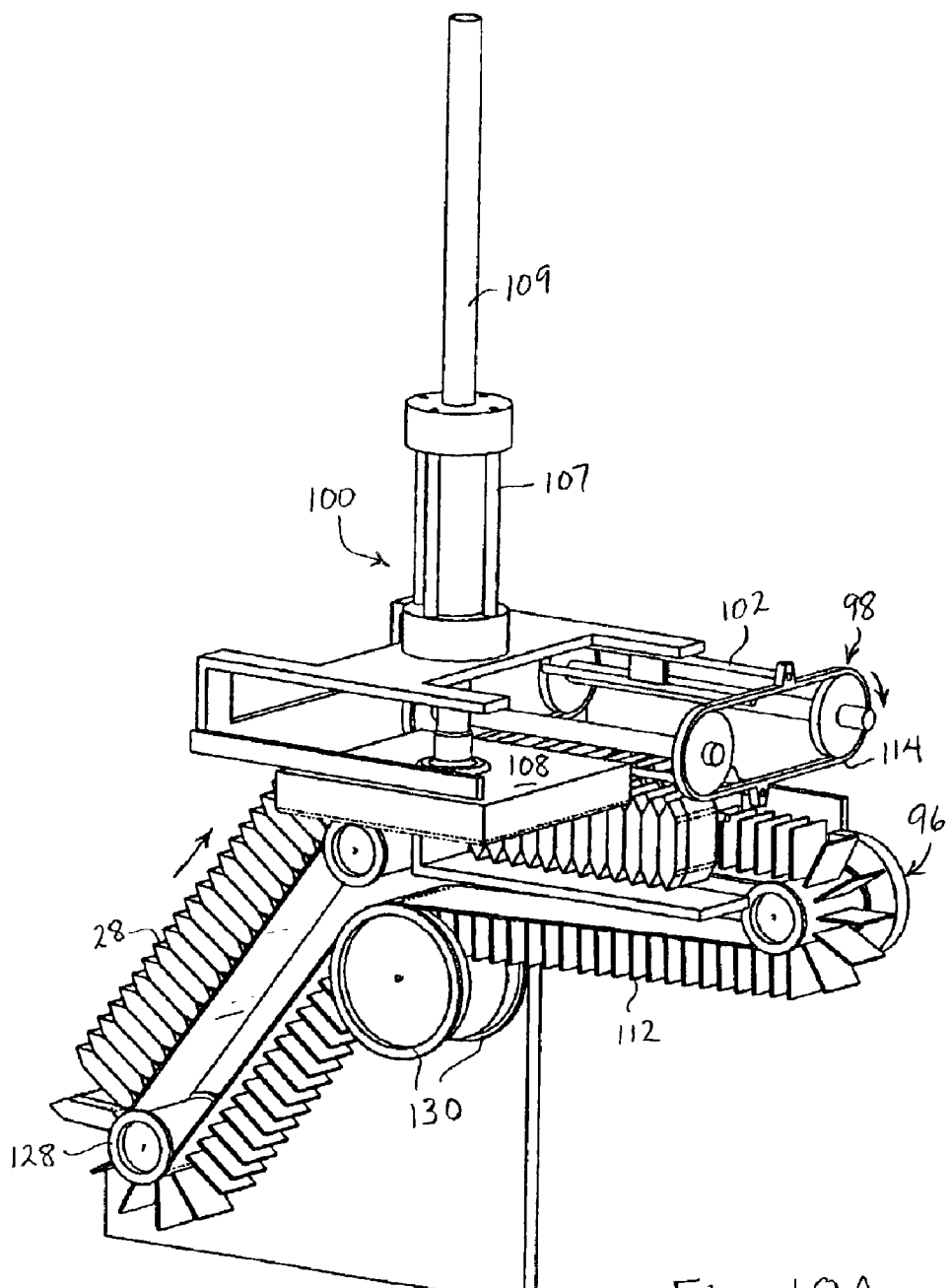
FIG. 10A representatively shows another schematic, perspective view of the loading section that can receive articles from the stacking section FIG. 11 representatively shows an enlarged, perspective view of the loading section that can be employed with the method and apparatus of the invention.

To help avoid a capturing of the subsequent, downstream equipment, the stacking conveyor 96 can be configured to have a distinctive "goose-neck" or "elbow" configuration, as representatively shown in FIGS. 9 through 10A. The exit or discharge portion of the conveyor can have a cantilevered configuration which can extend over and across a local machine-direction of the cooperating downstream equipment. As illustrated, the stacking conveyor can include a turning mechanism which helps form the elbow configuration. In a particular feature, the turning mechanism can include a first turn roller system 128 and a second turn roller system 130. The first turn roller system 128 may include at least one and desirably a plurality of individual rollers, and can be configured to operatively engage at least an appointed bottom-side portion of the conveyor 96. The second turn roller system 130 may include at least one and desirably a plurality of individual rollers, and can be configured to operatively engage at least a portion of an appointed article-side of the conveyor 96, which is opposite the bottom-side portion.

In the example of the shown arrangement, the second roller system 130 can include at least one cooperating pair of rollers, which can be axially spaced apart along the local cross-direction 24. Each roller of a roller-pair can operatively engage a corresponding side edge region of the stacking conveyor 96. For example, a timing chain may be attached to each side region of the stacking conveyor, and the rollers of the second roller system 130 can include gear-teeth that cooperatively engage with their corresponding timing chain.

The second roller system 130 is configured to allow a substantially unimpeded movement of any holding members or other conveyor members (e.g. paddle members 112) that may extend away from the article-side surface of the stacking conveyor. For example, the rollers of the second roller system 130 may have a relatively large diameter such that an axle shaft of the second roller system 130 is sufficiently spaced away from the article-side surface of the stacking conveyor to operatively avoid the paddle members 112 or any other members that project away from the article-side surface of the stacking conveyor. Other avoidance arrangements may also be employed, as desired. For example, each of the axially-spaced rollers 130 can be mounted on a separate axle that extend laterally away from the holding members and do not extend into the area between the rollers that is traversed by the holding members.

Figure 11:
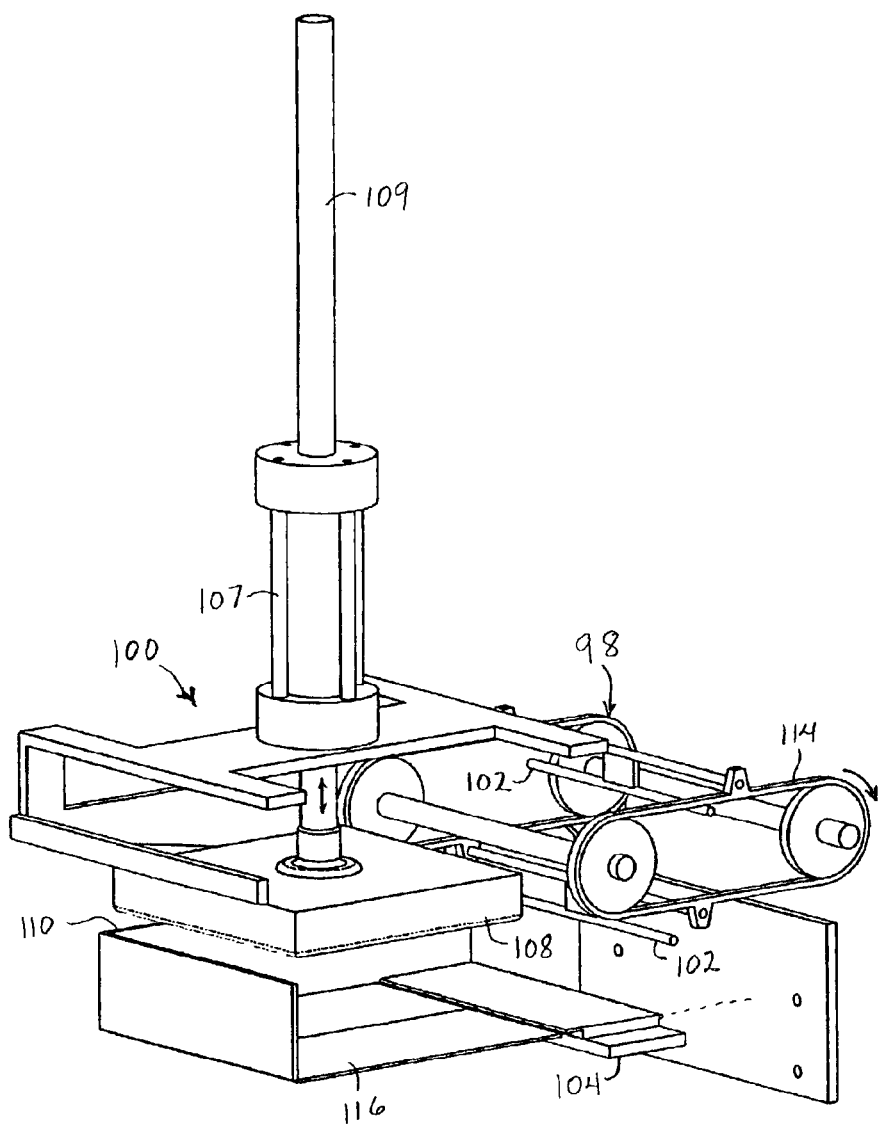
FIG. 11A representatively shows a perspective view of a loading section where a predetermined article-set has been positioned on a staging mechanism.
FIG. 11B representatively shows a perspective view of a loading section where a predetermined plurality of article-sets have been positioned in a loading mechanism.
FIG. 11C representatively shows a perspective view of a loading section where a predetermined plurality of article-sets are being moved into a selected package.
Figure 11A:
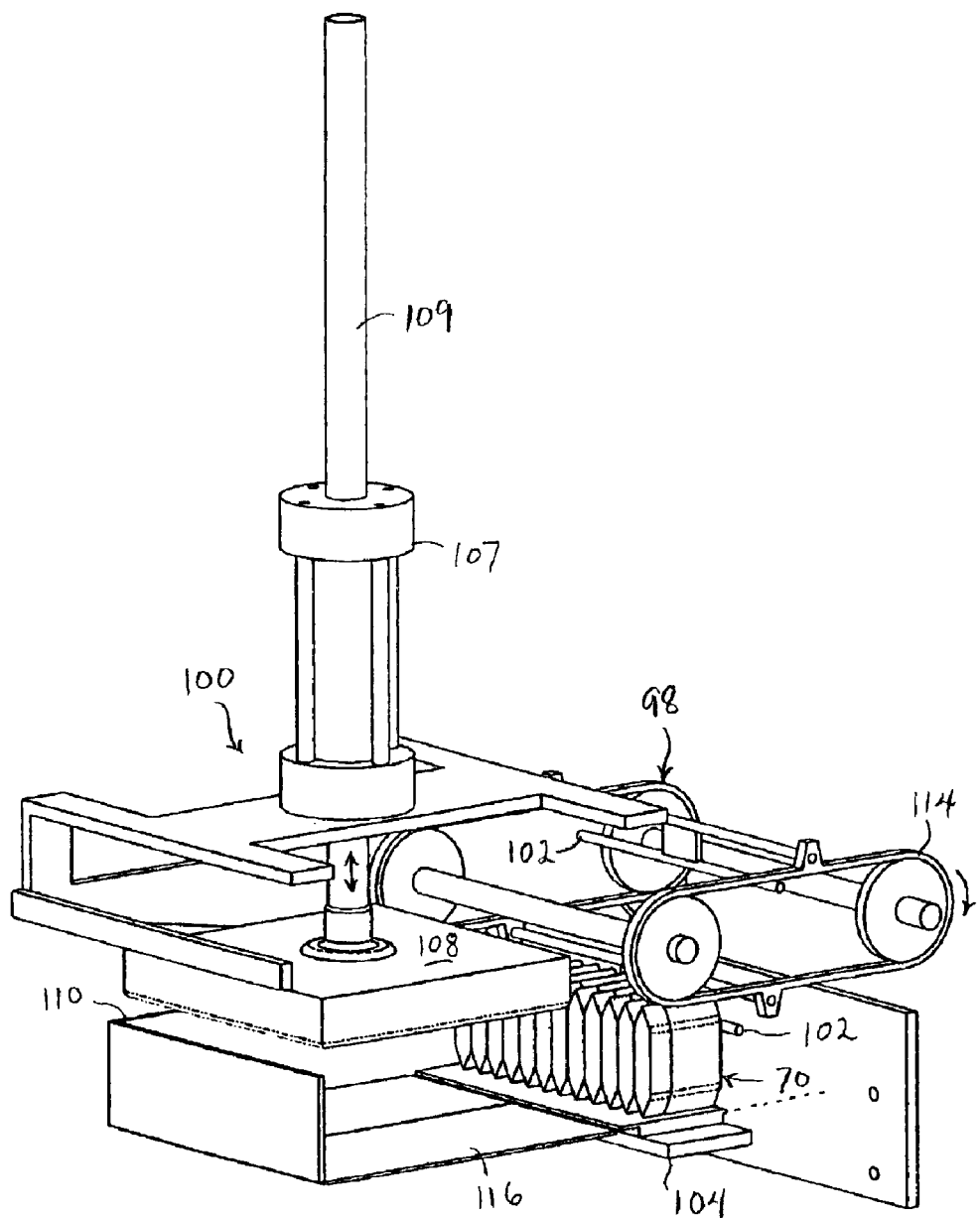
Figure 11B:
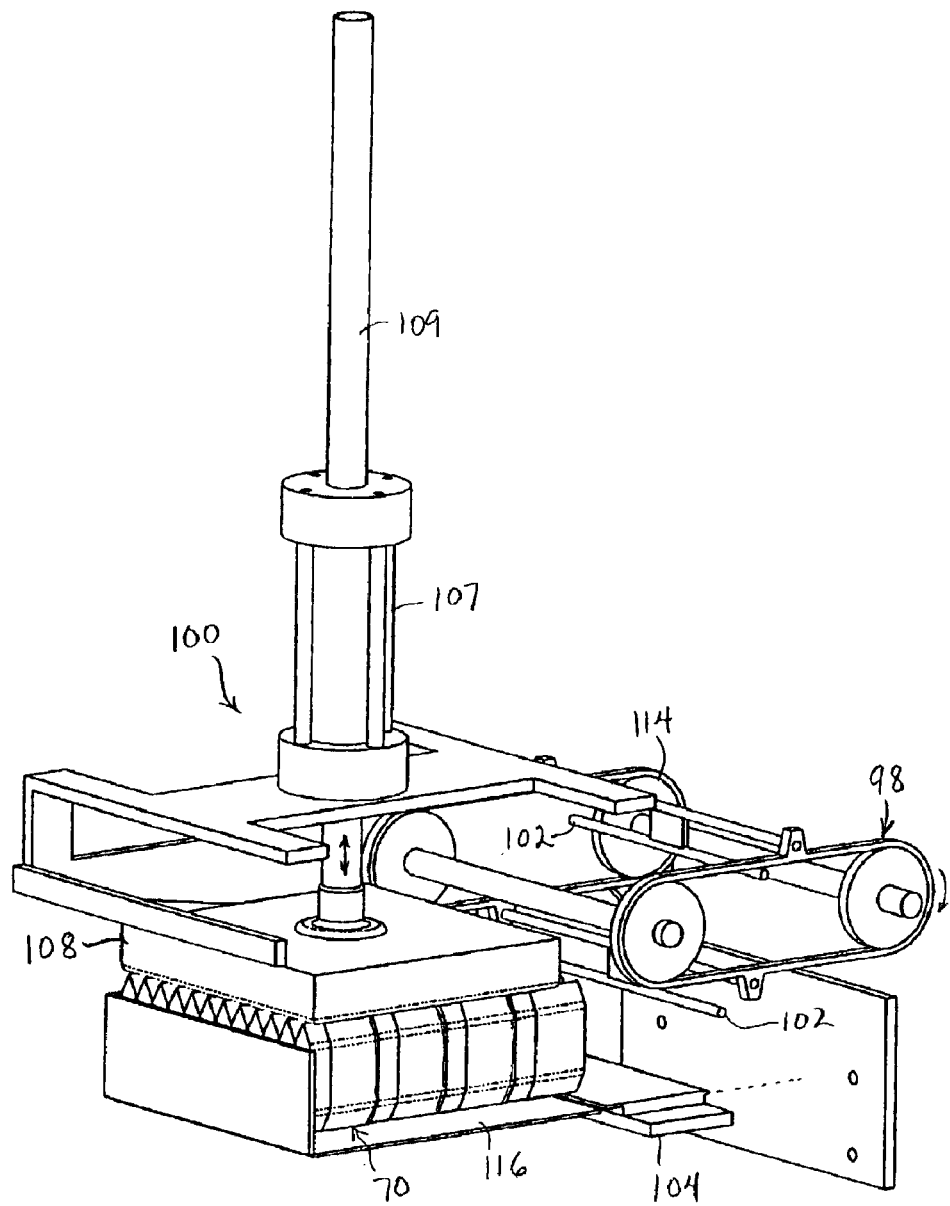
Figure 11C:
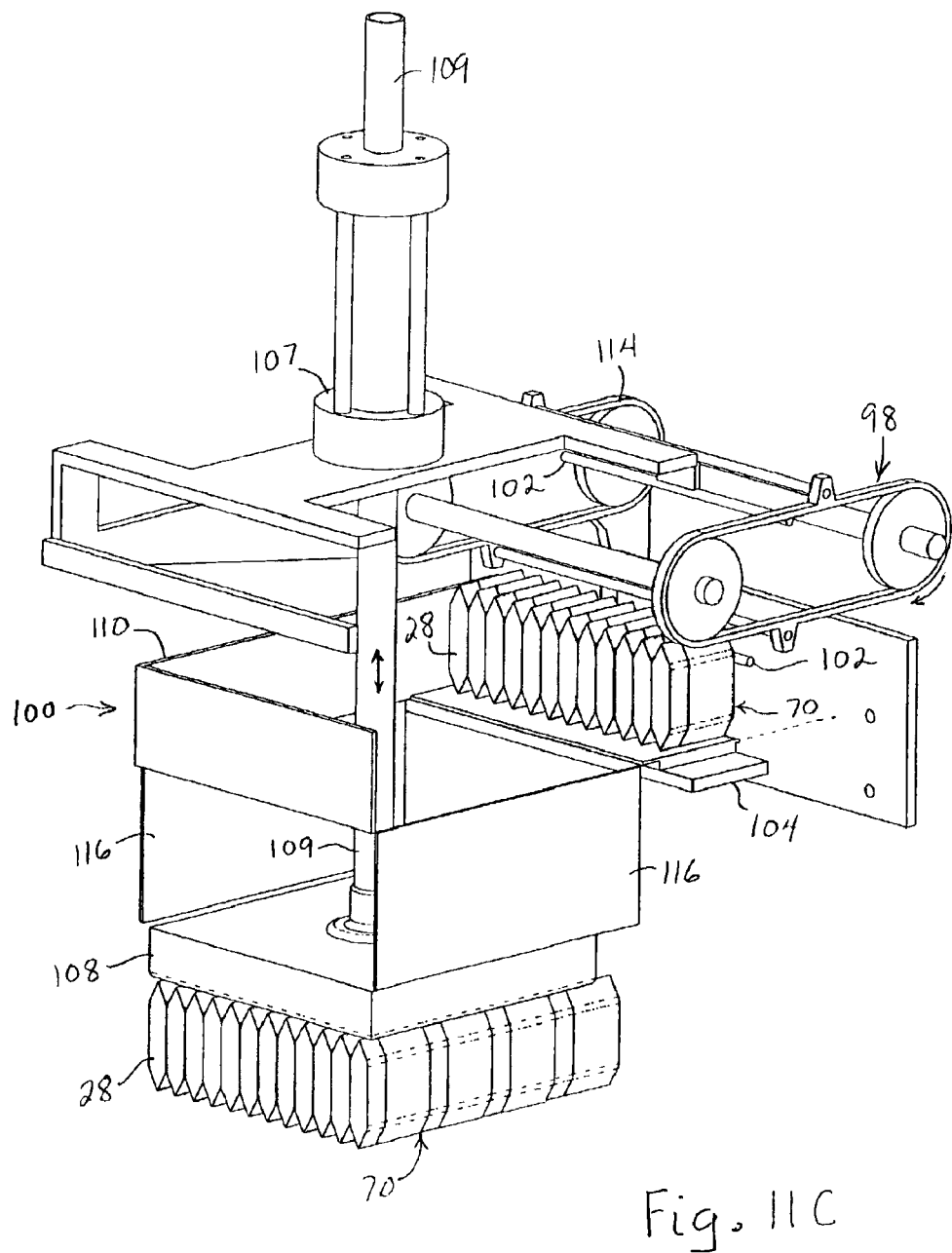

With reference to FIGS. 10 through 11C, a transfer, loading system of the method and apparatus can include a transfer pusher mechanism and a package loading mechanism. As representatively shown, a transfer pusher 98 can operatively transfer completed rows or other article-sets 70 of product from the stacking conveyor 96 to a subsequent, downstream package loading device 100. As representatively shown, the transfer mechanism 98 can include an overhead pusher carriage 114 and a pusher bar mechanism 102, and may further include a conventional finger assist mechanism that includes finger members that extend into the region between individual conveyor paddles 112 to engage the conveyed articles 28. The overhead pusher carriage can include a side-by-side drive which allows an overhead, circular rotation to convey the pusher bar. The overhead drive arrangement on the pusher carriage can be configured to return to a ready position without interfering with any article or machine component.

The control system of the method and apparatus can be configured in a conventional manner such that when a completed article-set 70 of product is ready for transfer, the pusher bar 102 will index forward from a ready position and push, pull or otherwise transfer the articles out of the stacking conveyor 96 and toward a storage buffer mechanism, such as provided by the illustrated staging plate member 104. The pusher bar 102 can be at least as long as a completed row of product and short enough to fit between optional side guide rails that can be located at an entrance into the staging plate area.

The finger assist mechanism (not shown) can be setup to fit between paddle members 112 of the stacking conveyor 96. This arrangement can allow a pushing action on the articles at location that is below its center of gravity, and can improve the consistency of the handoff from the conveyor 96.

The staging plate 104 provides an area upon which to stage at least one article-set 70 of product in the event that the package-loading device is not immediately able to accept the article-set. The staging plate can provide a substantially flat, smooth surface, and can include adjustable side rails 110. This arrangement can provide a storage buffer mechanism which assists a substantially continuous operation of the stacking conveyor 96, and can provide additional time to unload a desired plurality of article-sets into the packaging equipment. For example, a complete grouping of article-sets 70 (e.g. FIG. 1B) may include a multiplicity of two or more article-sets 70. The product articles may need to be staged until the desired number of rows or other article-sets have been gathered and are ready for online loading into the desired packaging configuration. The staging area can accept the required number of rows until the method and apparatus are ready to load them into the desired packaging. Various transfer pusher mechanisms are available from commercial vendors. For example, suitable mechanisms are available from Optima-Maschinenfabrik, Dr. Buhler GmbH & Co., a business having an address at Steinbeisweg 20, D-74523 Schwabish Hall, Germany Conventional sensors and controls can be employed to regulate the article stacking systems. In the representatively shown arrangement, for example, a stacking conveyor servo motor can be located on a drive point of the stacking conveyor 96 to operatively drive the stacker chain in a registered manner that is coordinated with a registration sensor located in the rotation conveyor system (e.g. twist-belts 66, 68).

A stacking conveyor home/registration detect sensor, such as provided by a photo-eye, can be configured to observe across at a finger on the stacker conveyor. The sensor can help sequence a "home" position on a once per product or on a product-to-product basis. This home position can be employed to provide a positional zero reference registration point, and can provide a starting reference point for a selected, electronically driven mechanical motion.

An article-counting sensor 78 (e.g. FIG. 9), such as provided by a photo-eye, can be located just upstream, before the transfer section from the stacker conveyor 96. The counting sensor 78 can help verify that a complete article-set is present for transfer. If an article-set is incomplete, the stacker conveyor 96 can be indexed further to present a next available article-set.

An overhead pusher transfer servo motor can be configured to drive the overhead stack transfer pusher 98 to convey articles from the stacker conveyor 96 into the package loader mechanism 100. An overhead pusher home switch, such as provided by a proximity switch, can be located on the overhead transfer pusher 98 to provide a home position reference for the overhead pusher device. An "article-present" sensor 79 (e.g. FIG. 9A), such as provided by a photo-eye, can be located along the path of the stacker conveyor 96 after the location of the transfer pusher mechanism 98. The sensor 79 can detect any residual, non-transferred articles that are to be culled from the stacker conveyor 96. A final cull device, such as provided by a blow-off cull solenoid valve, can be located relatively downstream from the transfer pusher section and positioned operatively proximate the article-present photo-eye. The cull device can be configured to remove any un-transferred articles that remain in the stacker conveyor. In an alternative arrangement, the method and apparatus may be configured to have gravity remove the residual articles in the culling operations.

As representatively shown in FIGS. 7 through 9A, an article, rotation control system can be configured to alter the orientation of an end-article 72 of a particular article-set 70, depending on the location of the selected indicator (e.g. adhesive) relative to the desired final orientation of the end-article when the end article is discharged from the stacker conveyor 96. The components of the rotation control system can include: a computer (e.g. an ALLEN-BRADLEY brand, 1756-L1 CONTROLLOGIX Programmable Logic Controller computer, and an ALLEN BRADLEY brand, 1394 Servo Controller computer which is available from Rockwell Automation, a business having offices located in Milwaukee, Wis.). Additionally, the control system can incorporate associated computer software and software know-how, which are also available from Rockwell Automation.

The stacker conveyor 96 can include an array of individual, article carriers, such as carrier slots or buckets. The article carriers are desirably, substantially regularly spaced along the length of the stacker conveyor, and typically will hold only one article. This attribute can be of particular assistance in the operation of the orienting, rotation control system.

Each article-set 70 can, for example, have a certain number of articles per "row". The control system will be programmed to know the number of articles per row and utilize it to decide whether or not a particular end-article needs an adjusted orientation or rotation. Upon an initial system startup, the stacker conveyor 96 will synchronize itself by way of the servo control of the stacker conveyor, and will align itself onto one of the stacker conveyor "buckets". This system alignment will represent the system count reference position.

On each row of product, the first and last article of the row would represent the end-articles that are to be particularly examined to determine whether or not an adjusting rotation is desired. For example, the method and apparatus may be configured to align the end-articles such that the flap-member of the article is either (a) facing inwardly toward the rest of the current row, or (b) aligned such that a movement of the article across a friction-producing surface would keep the flap-member closed and not undesirably open or expose adhesive. In a particular configuration of the invention, there can be four possible orientations of the pouch and three out of four will normally be acceptable from an orientation standpoint. The control system of the present invention can advantageously detect the actual orientation of the identified end-article, and compare it to the acceptable orientations of the end-article. If a predicted-orientation of a particular end-article differs from all of the acceptable-orientations, the rotation conveyor system can be appropriately shifted to a different arrangement prior to moving that particular end-article into the rotational conveyor system (e.g. twist-belts 66, 68).

A first aspect of this operational task is to identify the location of the end-articles (e.g. the first and last articles in a product row) with respect to the entry of the stacker conveyor 96. This can be accomplished by manually inputting each desired packaging or bag configuration into the computer software. For example, if the bag configuration has a row, article count of 10, then the software would count the number of articles from our reference position to the entry of the stacker. This count can be computed into the following formula by looking at the remainder of the following division formula:

{Buckets from Entry to Reference}/(Product Row Count)=>Value plus remainder

A software-initiated counter would count to the number of articles in each row, and would count from one to the selected top number. The counter would reset when the top number would be reached. The counting is performed each time the stacking conveyor accepts a new article and indexes to its next position to accept the next new article. This operation can create the following, recurring sequence:

Example Row Count=10

1, 2, 3, 4, 5, 6, 7, 8, 9, 10, 1, 2, 3, 4, 5, 6, 7, 8, 9, 10, 1, 2, . . .

Based on this sequence range and the remainder-value of the previous division calculation, the computer can determine which articles need to be identified for reorientation or rotation. The remainder-value would represent the first product to be examined and can represent an appointed "outside" article, which is the article which will come in contact with a side guide mechanism positioned on a relatively far, first side of an operative packaging or bagger device. The desired orientation for this end-article is such that the end-article is facing inward, toward the rest of the row stack, or turned such that the "open edge" of the flap-member is directed downstream, opposite to the direction flow of the packaging or bagger system. This desired result can be designated as "A".

An appointed "inside" article, or article which comes into contact with a side guide mechanism on a relatively near, second side of the selected packaging or bagger equipment, can be determined by subtracting "one" article from the remainder-value number. If there is no remainder-value, then the "one" value should be subtracted from the Row Count. If the remainder is one then the value will be the value of the Row Count (e.g. 10). One can identify this result as "B". The article's desired orientation is to be such that it is facing inward toward the rest of the row stack, or turned such that the "open edge" of the flap-member is directed downstream, opposite to the direction flow of the packaging or bagger system.

Results A and B will be used to compare to the recirculating counter, which counts from "1" up to the selected Row Count (e.g. 1–10). When the counter value equals either A or B it will be compared to the predicted orientation, and may or may adjust the rotation conveyor system to a different index position, based on the feedback data from the indicator (e.g. adhesive) detection system.

The indicator detection can, for example, arise from data generated from the adhesive detecting, luminescence sensors. An array of three sensors can be employed to help minimize the amount of indexing needed by the rotation conveyor system. After an article has been processed by the turning member 58, the indicator sensors 60 can, for example, be mounted to look at the top and bottom edge regions of one major facing-surface on one side of the article, and to look at a region on an opposite, major facing-surface of the article. Each article can be examined in a conveyor drive gap between belt rollers where a gap or spacing between articles will be created due to speed differential between the conveyors. There may be a small buffer area between sensing operation and the entry to the rotational conveyor system. Photo-eyes can detect and count articles moving in and out relative to the reference in-feed point to ensure that a proper pad orientation is being examined.

An automatic bagger or package loader mechanism 100 can be employed to determine a spare, operational opening in the packaging or bagger in-feed, and to load a complete article-set of product into the running bagger. The packaging loading device or mechanism 100 of the method and apparatus can take one or more article-sets of product and automatically load them into the final packaging machinery (e.g. FIGS. 11 through 11C). Accordingly, the method and apparatus of the invention can move at least one appointed article-set 70, and optionally a plurality of the article-sets into a corresponding package.

The package loading device or mechanism 100 can include a bottom trap door system 116, end rails and side rails 110, and a pusher device. In a particular feature, the mechanism can include an overhead, vacuum pusher device. As representatively shown, the loading device 100 can accept article-sets 70 of product at its in-feed. The bottom trap door portion of the loading device can be configured to move to an open-position such that the open trap door members (e.g. door plates 116) can become flush with the package being loaded while substantially avoiding any mechanical conflict with a cooperating packaging conveying system. The door members can be operatively controlled by various well known, conventional mechanisms. For example, the door plates 116 can be controlled by a mechanism or system which includes a mechanical rotational cylinder. The control system of the method and apparatus can be configured to open just prior to a loading operation conducted by the packaging system, and to close when the loader device 100 is receiving article-sets of product from the product transfer pusher 98.

The overhead vacuum pusher device can include a vacuum box 108 and a vacuum conduit 109 which is operatively connected to the vacuum box. Additionally, a pusher-device actuator, such as provided by pneumatic actuator cylinders 107, can be attached to move the vacuum box to desired predetermined pusher-positions. In a particular feature, the vacuum pusher device can be operatively positioned over and vertically above the completed article-set of product appointed for packaging, and can employ a vacuum force to operatively engage the article-set. The vacuum is operatively configured to make a positive connection with the appointed article-set, and help hold the articles in a position appropriate for loading into the final packaging equipment. In a desired feature, the overhead vacuum pusher system can be configured to maintain the array of articles and vacuum-hold the articles against the vacuum box 108 in a substantially fully-suspended position. The actuator can be operated to extend and operatively move the vacuum box 108 and associated articles to a desired packaging position. Additionally, the method and apparatus can be configured to release the vacuum as soon as the articles have been suitably transferred or otherwise moved into the downstream, final packaging machinery. After the articles have been released, the actuator can be operated to retract and return the vacuum box to an initial position suitable for receiving and holding a new grouping of articles 28.

Accordingly, the transfer pusher mechanism 98 can index and position an article-set into the appointed staging area (e.g. as provided by a structure which includes staging plate 104). When sufficient rows or other article-sets are present and when a spare opening is detected in the bagger, a top pusher mechanism of the package loader 100 can press down while bottom plates of the package loader are opened. The top pusher can include a vacuum source which can help hold the appointed article-set as the bottom trap-door is opened. This system can then return to a ready-position after each loading operation. The staging dead-plate 104 can be mounted between the packaging loader and the stacker finger area to stage a row of pads while a loading operation is occurring.

Conventional sensors and controls can be employed to regulate the article packaging or bagging systems. A trapdoor-closed sensor, such as provided by a proximity switch, can be employed to monitor each of the trap doors of the loading mechanism 100. Each trap door may, for example, be operated by a rotational trap door cylinder, and each rotational cylinder can be configured with a proximity switch to verify that the trap door is closed. Similarly, a trap-door-open sensor, such as provided by a proximity switch, can be employed to further monitor each of the trap doors of the loading mechanism 100. Each trap door may, for example, be operated by a rotational trap door cylinder, and each rotational cylinder can be configured with a proximity switch to verify that the trap door is open.

A packaging loader, vacuum-pusher-retracted sensor, such as provided by a proximity switch, can be located on an actuator device of the loading mechanism 100 to verify that the load pusher is fully up and ready to accept new product. The actuator may, for example, include a pneumatic actuating cylinder.

An overhead loader, vacuum-pusher-at-prestage sensor, such as provided by a proximity switch, can be located on the actuator device to verify that the load pusher member is at an appointed prestage position, and is ready to drop to a discharge height. Additionally, a packaging loader, vacuum-pusher-at-discharge sensor, such as provided by a proximity switch, can be located on the actuating cylinder to verify that the load pusher is at a predetermined discharge position, and is ready to release vacuum to drop the articles.

An overhead pusher, loader-extend mechanism, such as a device that includes a solenoid valve, can be employed to control the loader, actuating cylinder. The valve can operatively control a desired extension of the overhead portion of the loader pusher. An overhead pusher, loader-retract mechanism, such as a device which includes a solenoid valve, can be employed to further control the loader-actuating cylinder. The valve can operatively control a desired retraction of the overhead portion of the loader pusher.

A vacuum sensor can be employed to detect vacuum present on packaging loader 100, and can be located on the overhead pusher loader mechanism. The vacuum sensor can be configured to detect a positive vacuum presence prior to allowing the trap doors to open for loading. Additionally, a vacuum enable mechanism, such as provided by a device which includes a solenoid valve, can used to control the vacuum delivered to a vacuum box in the overhead pusher of the packaging loader 100.

Conventional vacuum generator systems can provide the vacuum needs of the method and apparatus. For example, the vacuum system can provide an operative vacuum to the vacuum take-away conveyor 96 and the packaging loader 100.

Various transporting or conveying devices may be employed to move the target work material (e.g. the articles 28) through and between the various operations provided by the method and apparatus, and any operative transport or conveyor mechanism may be employed. Such transport or conveying devices can, for example, be provided by transport rollers, conveyor belts, pneumatic conveyors, vacuum conveyors, electromagnetic conveyors, fin style conveyors, pushing mechanisms or the like, as well as combinations thereof.

In the various attachments and securements employed in the constructions of the method and apparatus of the invention, it should be readily apparent that any conventional attachment or securement technique may be employed. Such techniques may, for example, include adhesives, welds, screws, bolts, rivets, pins, latches, clamps or the like, as well as combinations thereof.

Similarly, it should be readily apparent that any conventional material may be employed to construct the various components incorporated into the method and apparatus of the invention. Such materials can include synthetic polymers, fiberglass-resin composites, carbon fiber-resin composites, metallic composites, ceramic composites, and the like, as well as combinations thereof. The materials are typically selected to provide desired levels of strength, durability, ease of manufacture, and ease of maintenance.

The method and apparatus of the invention can occupy a relatively small amount of floor space and can be highly portable. The method and apparatus can, for example, be setup to allow relatively easy movement amongst manufacturing machines, and to allow a quick setup by plugging into electric and pneumatic power sources. The method and apparatus can be mounted onto rollable wheels, and can be selectively anchored in place with set pins.

The method and apparatus can provide automatic jam disruption, and can blow-off or cull any additional product at the stacking conveyor in-feed, if a change to a stopped or paused state is needed. This functionality can be accomplished by employing air-blast devices. For example, the air-blast devices can be located at the bottom of the directing slide 42 and at the in-feed to the stacking conveyor system 96. The air-blasts can be triggered through jam-detection, photoelectric sensors that provide data to the computer control system.

Distinctive buffers can be incorporated to substantially eliminate a need to stop or stall due to a lack of articles or due to timing issues when operating at normal, designed running speeds. For example, the metering drum 40 can provide a buffer point. When the feed hopper 26 has emptied its contents into the metering drum 40, sufficient product is in the metering drum to allow time for the hopper to be refilled and to resume product flow into the drum. Continuous product flow can also be assisted by using the air blast at the in-feed to the stacking conveyor 96. If timing considerations are such that the stacker conveyor 96 is unable to advance to accept the next article, the air-blast can cull the article to keep the system in a running state. Additionally, the dead-plate 104 between the transfer pusher 98 and the packaging loader 100 can help provide a desired, continuous operation. Further, the overhead attribute of the product transfer device, allows rows of articles to be transferred in a continuous operation without making the stacker conveyor 96 wait for a return of the transfer pusher 98.

Although various illustrative and representative configurations have been described in detail herein, it is to be appreciated that other variants, modifications and arrangements are possible. All of such variations, modifications and arrangements are to be considered as being within the scope of the present invention.

What is claimed is:

1. A method for accumulating articles, said method comprising:

inputting a plurality of individual artides to deliver said articles from an article supply source onto an inclined slide having a guide surface, each article having at least a first major facing surface, a first article dimension extending along a first article direction, a second article dimension extending along a second article direction which differs from said first article direction, and an article edge region;

regulating said articles with a guide member; and directing said articles to a first conveyor;

wherein said inputting of said articles has included a dispensing of said articles onto said inclined slide with a rotatable, metering drum which has an entry end, an exit end and an inside wall surface, said metering drum configured such that a rotation of said metering drum overcomes a static friction which inhibits a movement of said articles downstream through said metering drum; and a ramp member has been configured to extend an operative distance into the volume of the metering drum at the exit end of the metering drum, and has been spaced away from the inside wall surface of the metering drum by a selected offset distance.

2. A method as recited in claim 1, wherein said inputting of said articles includes a laying of said articles onto said inclined slide.

3. A method as recited in claim 1, wherein said inclined slide has been provided with a slide angle which is at least about 30°.

4. A method as recited in claim 1, wherein said regulating of said articles employs a substantially curvilinear guide member.

5. A method as recited in claim 4, wherein said guide member is provided by a guide fence that extends away from said slide surface.

6. A method as recited in claim 5, wherein said guide member is formed to incorporate a funnel curve.

7. A method as recited in claim 6, wherein said funnel curve is a generally S-shaped curve.

8. A method as recited in claim 1, further including an engaging of the edge region of each article with said first conveyor to provide a standing, edge-up arrangement of each article.

9. A method as recited in claim 1, wherein said method further includes rotating selected articles with a turning system to operatively align the first dimension of the selected articles along a machine-direction of the first conveyor.

10. A method as recited in claim 9, wherein said rotating of the selected articles includes contacting the selected articles with a turning member having an inclined entry region.

11. A method as recited in claim 9, wherein said rotating of the selected articles includes processing the selected articles with a bottom catch plate.

12. A method as recited in claim 7, further including transporting said articles to and/or from the turning system with a second conveyor, said second conveyor configured to accept articles transferred from said first conveyor, and configured to run at a second conveyor speed which is operatively faster than a first conveyor speed provided by said first conveyor.

13. A method as recited in claim 12, wherein said second conveyor includes a side-by-side nip belt system.

14. A method as recited in claim 1, wherein said first conveyor includes a vacuum conveyor which actively engages articles that enter the first conveyor.

15. An apparatus for accumulating articles, said apparatus comprising:

an article supply source for providing articles, each article having
   at least a first major facing surface,
   a first article dimension extending along a first article direction,
   a second article dimension extending along a second article direction which differs from said first article direction, and
   an article edge region;

an inclined slide that has a guide surface and is configured to receive articles delivered from said article supply source;

a guide member which is configured to regulate the articles delivered to said inclined slide;

a rotatable metering drum which is configured to dispense said articles onto said inclined slide; the metering drum having an entry end, an exit end and an inside wall surface, and the metering drum configured such that a rotation of said metering drum overcomes a static friction which inhibits a movement of said articles downstream through said metering drum; and a ramp member which is configured to extend an operative distance into the volume of the metering drum at the exit end of the metering drum, and is spaced away from the inside wall surface of the metering drum by a selected offset distance.

16. An apparatus as recited in claim 15, wherein said inclined slide has a slide angle which is at least about 30°.

17. An apparatus as recited in claim 15, further including a first conveyor which receives articles directed by said inclined slide.

18. An apparatus as recited in claim 17, further including an article stop plate mechanism which can direct the articles to engage the edge region of each article on said first conveyor, and provide a standing, on-edge arrangement of each article.

19. An apparatus as recited in claim 17, further including a transfer guide ramp mechanism which can operatively provide a substantially smooth contour between said inclined slide and said first conveyor.

20. An apparatus as recited in claim 15, further including a substantially curvilinear guide member which regulates the articles delivered to said inclined slide.

21. An apparatus as recited in claim 20, wherein said guide member includes a guide fence that extends away from said slide surface.

22. An apparatus as recited in claim 20, wherein said guide member is formed to incorporate a generally S-shaped, funnel curve.

23. An apparatus as recited in claim 15, further including a first conveyor which is configured to move the articles away from said inclined slide; said first conveyor including a vacuum conveyor which actively engages articles that enter said first conveyor.

24. An apparatus as recited in claim 23, wherein said apparatus further includes a turning system which rotates selected articles to operatively align the first dimension of the selected articles along a machine-direction of the first conveyor.

25. An apparatus as recited in claim 24, wherein said turning system includes a turning member having an inclined entry region.

26. An apparatus as recited in claim 25, wherein said turning system includes a bottom catch plate.

27. An apparatus as recited in claim 23, further including a second conveyor which transports the articles to and/or from said turning system; said second conveyor configured to accept articles transferred from said first conveyor, and configured to run at a second conveyor speed which is operatively faster than a first conveyor speed provided by said first conveyor.

28. An apparatus as recited in claim 27, wherein said second conveyor includes a side-by-side nip belt system.

29. A method for accumulating articles, said method comprising:

inputting a plurality of individual articles to deliver said articles from an article supply source onto an inclined slide having a guide surface, each article having at least a first major facing surface, a first article dimension extending along a first article direction, a second article dimension extending along a second article direction which differs from said first article direction, and an article edge region;

regulating said articles with a guide member;

directing said articles to a first conveyor; and rotating selected articles with a turning system to operatively align the first dimension of the selected articles along a machine-direction of the first conveyor.

30. A method as recited in claim 29, wherein said rotating of the selected articles includes contacting the selected articles with a turning member having an inclined entry region.

31. A method as recited in claim 30, wherein said rotating of the selected articles includes processing the selected articles with a bottom catch plate.

32. A method for accumulating articles, said method comprising:

inputting a plurality of individual articles to deliver said articles from an article supply source onto an inclined slide having a guide surface, each article having at least a first major facing surface, a first article dimension extending along a first article direction, a second article dimension extending along a second article direction which differs from said first article direction, and an article edge region;

directing said articles to a first conveyor;

rotating selected articles with a turning system to operatively align the first dimension of the selected articles along a machine-direction of the first conveyor; and transporting said articles to and/or from the turning system with a second conveyor; said second conveyor configured to accept articles transferred from said first conveyor, and configured to run at a second conveyor speed which is operatively faster than a first conveyor speed provided by said first conveyor.

33. A method as recited in claim 32, wherein said second conveyor includes a side-by-side nip belt system.

* * * * *